(12) United States Patent
Kondo et al.

(10) Patent No.: US 9,880,910 B2
(45) Date of Patent: *Jan. 30, 2018

(54) ASYNCHRONOUS REMOTE COPY SYSTEM AND STORAGE CONTROL METHOD

(71) Applicants: Shuji Kondo, Odawara (JP); Katsuhiro Okumoto, Odawara (JP)

(72) Inventors: Shuji Kondo, Odawara (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1232 days.

This patent is subject to a terminal disclaimer.

(21) Appl. No.: 13/740,351

(22) Filed: Jan. 14, 2013

(65) Prior Publication Data

US 2013/0132693 A1 May 23, 2013

Related U.S. Application Data

(63) Continuation of application No. 12/864,298, filed as application No. PCT/JP2010/002540 on Apr. 7, 2010, now Pat. No. 8,375,004.

(51) Int. Cl.
G06F 17/30 (2006.01)
G06F 11/16 (2006.01)
G06F 11/20 (2006.01)

(52) U.S. Cl.
CPC ...... *G06F 11/1645* (2013.01); *G06F 11/2058* (2013.01); *G06F 11/2074* (2013.01);
(Continued)

(58) Field of Classification Search
CPC ............. G06F 11/1456; G06F 11/2058; G06F 11/2074; G06F 11/2079; G06F 11/2082; G06F 2201/855
See application file for complete search history.

(56) References Cited

U.S. PATENT DOCUMENTS 6,745,303 B2 6/2004 Watanabe
8,086,881 B2 12/2011 Maruyama et al.
(Continued)

FOREIGN PATENT DOCUMENTS

JP 200665629 A 3/2006

OTHER PUBLICATIONS

European Search Report received in European Application No. 10841823 dated Apr. 1, 2014.

*Primary Examiner* — Mark D Featherstone
*Assistant Examiner* — Navneet Gmahl
(74) *Attorney, Agent, or Firm* — Mattingly & Malur, PC

(57) ABSTRACT

In a previous storage apparatus, differential JNLs are reflected in order of the sequential numbers, to the data volumes thereof. If a first storage apparatus is suspended, it is determined which is newer: the sequential number which the journal recently reflected in a second storage apparatus or the sequential number reflected in a third storage apparatus. In the newer storage apparatus having the newer sequential number, it is determined whether one or more JNLs from the journal having the sequential number next to the sequential number which is not determined to be the newer to the journal having the sequential number determined to be the newer exist, or not. If the result of the determination is positive, from the newer storage apparatus to the previous storage apparatus which is not the newer of the second and the third storage apparatuses, one or more differential JNLs are copied.

7 Claims, 35 Drawing Sheets

(52) U.S. Cl.
CPC ...... *G06F 11/2079* (2013.01); *G06F 11/2082* (2013.01); *G06F 2201/855* (2013.01)

(56) References Cited

U.S. PATENT DOCUMENTS

| | | |
|---|---|---|
| 2005/0050288 A1 | 3/2005 | Takahashi et al. |
| 2005/0188253 A1* | 8/2005 | Kawamura ......... G06F 11/2064 714/6.12 |
| 2005/0204106 A1 | 9/2005 | Testardi |
| 2005/0273565 A1* | 12/2005 | Hirakawa ........... G06F 11/2058 711/162 |
| 2006/0123212 A1 | 6/2006 | Yagawa |
| 2007/0050547 A1* | 3/2007 | Sano .................. G06F 11/2082 711/114 |
| 2007/0050574 A1 | 3/2007 | Kaiya et al. |
| 2008/0040402 A1 | 2/2008 | Judd |
| 2008/0104443 A1* | 5/2008 | Akutsu ............... G06F 11/2058 714/6.12 |
| 2008/0154914 A1 | 6/2008 | Kan et al. |
| 2008/0201527 A1 | 8/2008 | Suzuki et al. |
| 2009/0125691 A1 | 5/2009 | Nakanishi |

* cited by examiner

FIG. 14

| SEQ# | Write destination Information | PVOL# | SVOL# | .. |
|---|---|---|---|---|

| JNL group # | JVOL valid bitmap | | | | | |
|---|---|---|---|---|---|---|
| | 0 | 1 | 2 | 3 | ... | 63 |
| 0 | 1 | 0 | 0 | 0 | | 0 |
| 1 | 1 | 1 | 1 | 0 | | 0 |
| 2 | 0 | 0 | 0 | 0 | | 0 |
| 3 | 0 | 0 | 0 | 0 | | 0 |
| : | | | | | | |
| 255 | 0 | 0 | 0 | 0 | | 0 |

| JNL group # | DVOL valid bitmap | | | | | | |
|---|---|---|---|---|---|---|---|
| | 0 | 1 | 2 | 3 | ... | 63 | |
| 0 | 0 | 0 | 0 | 1 | | 0 | |
| 1 | 0 | 0 | 0 | 1 | | 0 | |
| 2 | 0 | 0 | 0 | 0 | | 0 | |
| 3 | 0 | 0 | 0 | 0 | | 0 | |
| : | | | | | | | |
| 255 | 0 | 0 | 0 | 0 | | 0 | |

JVOL management table

| JVOL# | Meta area initial address | Meta area size | Data area initial address | Data area size |
|---|---|---|---|---|
| 1 | 0x0000 | 2GB | 0x0020 | 98GB |
| 2 | 0x0000 | 2GB | 0x0020 | 98GB |
| 3 | 0x0000 | 2GB | 0x0020 | 98GB |
| .. | .. | .. | .. | .. |

FIG. 19

704A JNL GROUP MANAGEMENT TABLE

| 1001A<br>JNL group # | 1002A<br>Status | 1003A<br>Mirror # | 1004A<br>Corresponding JNL group # | 1005A<br>Corresponding Storage # | 1006A<br>Purged SEQ# | 1007A<br>Purgeable SEQ# | 1008A<br>Read SEQ# |
|---|---|---|---|---|---|---|---|
| 1 | Master | 0 | 2 | 2 | 15 | 21 | NULL |
|   |   | 1 | 3 | 3 | 15 | 29 | NULL |
|   |   | 2 | NULL | NULL | NULL | NULL | NULL |
|   |   | 3 | NULL | NULL | NULL | NULL | NULL |
| 2 | Restore | 0 | 1 | 1 | 14 | 21 | NULL |
|   |   | 1 | NULL | NULL | NULL | NULL | NULL |
|   |   | 2 | 3 | 3 | NULL | NULL | NULL |
|   |   | 3 | NULL | NULL | NULL | NULL | NULL |
| 3 | Restore | 0 | 1 | 1 | 14 | 29 | NULL |
|   |   | 1 | 2 | 2 | NULL | NULL | NULL |
|   |   | 2 | NULL | NULL | NULL | NULL | NULL |
|   |   | 3 | NULL | NULL | NULL | NULL | NULL |
| .. | .. | .. | .. | .. | .. | .. | .. |
| 256 | Not set | 0 | NULL | NULL | NULL | NULL | NULL |
|   |   | 1 | NULL | NULL | NULL | NULL | NULL |
|   |   | 2 | NULL | NULL | NULL | NULL | NULL |
|   |   | 3 | NULL | NULL | NULL | NULL | NULL |

FIG. 20

PAIR MANAGEMENT TABLE 705A

| DVOL# | JNL group # | Copy destination VOL # | Status |
|---|---|---|---|
| 1 | 1 | 2 | PAIR |
| 1 | 1 | 3 | SMPL |
| 2 | 2 | NULL | NULL |
| 3 | 3 | NULL | NULL |
| .. | .. | .. | .. |

1101A / 1102A / 1103A / 1104A

ASYNCHRONOUS REMOTE COPY SYSTEM AND STORAGE CONTROL METHOD

CROSS-REFERENCE

This is a continuation of U.S. Ser. No. 12/864,298, filed Jul. 23, 2010. This application claims priority from National Stage of PCT/JP2010/002540, filed Apr. 7, 2010. The entire disclosures of all these applications are hereby incorporated by reference.

TECHNICAL FIELD

This invention relates to storage control in a storage system performing remote copy which is data copy among storage apparatuses.

BACKGROUND ART

Remote copy which is the data copy between the first and the second storage apparatuses is known. The types of remote copy are, for example, synchronous remote copy and asynchronous remote copy. If the first storage apparatus receives a write request from a host and if synchronous remote copy is adopted, after the data complying with the write request is transferred from the first storage apparatus to the second storage apparatus, a write completion response is transmitted to the host apparatus while, if asynchronous remote copy is adopted, even if the data complying with the write request is not transferred from the first storage apparatus to the second storage apparatus, the write completion response is transmitted to the host apparatus.

In a remote copy system to which asynchronous remote copy is adopted (hereinafter referred to as an asynchronous remote copy system), for example, the first storage apparatus, as well as a first DVOL (a logical volume in which the data is stored), comprises a first JVOL (a logical volume in which a journal (hereinafter referred to as a JNL) is stored). Similarly, the second storage apparatus comprises a second JVOL as well as a second DVOL. The first storage apparatus, if receiving a write request, stores the data complying with the write request in the first DVOL and, at the same time, stores the JNL of the data in the first JVOL. The first storage apparatus transfers the JNL in the first JVOL to the second storage apparatus, and the second storage apparatus writes the JNL from the first storage apparatus to the second JVOL. After that, the second storage apparatus writes the data which the JNL in the second JVOL comprises to the second DVOL. By this method, the data written to the first DVOL is considered to have been copied to the second DVOL.

In the Patent Literature 1, an asynchronous remote copy system in the multi-target method is disclosed. In the multi-target method, for one copy source, multiple copy destinations exist. As more specifically described, in the Patent Literature 1, for example, the items below are disclosed.

A first storage apparatus, a second storage apparatus, and a third storage apparatus exist.

The first storage apparatus is the copy source, and the second and third storage apparatuses are the copy destinations from the first storage apparatus.

A first host apparatus is connected to the first storage apparatus, a second host apparatus is connected to the second storage apparatus, and a third host apparatus is connected to the third storage apparatus.

The first storage apparatus comprises a first DVOL, a first first JVOL, and a second first JVOL.

The second storage apparatus comprises a second DVOL and a second JVOL.

The first and the second DVOLs are paired. The first DVOL is the primary DVOL and the second DVOL is the secondary DVOL.

The third storage apparatus comprises a third DVOL and a third JVOL.

The first and the third DVOLs are paired. The first DVOL is the primary DVOL and the third DVOL is the secondary DVOL.

The first host apparatus writes the data to the first DVOL.

The first storage apparatus writes the JNL of the data written to the first DVOL to both the first first JVOL and the second first JVOL. The JNLs, as well as the input/output target data of the host apparatus, include update numbers.

The JNL in the first first JVOL is copied to the second JVOL.

The second storage apparatus, among one or more JNLs in the second JVOL which are not reflected, reflects the JNL comprising the oldest update number in the second DVOL (writes the data which the JNL comprises to the second DVOL).

The JNL in the second first JVOL is copied to the third JVOL.

The third storage apparatus, among one or more JNLs in the third JVOL which are not reflected, reflects the JNL comprising the oldest update number in the third DVOL (writes the data which the JNL comprises to the third DVOL).

Furthermore, according to the Patent Literature 1, if a failure occurs in the first storage apparatus, the second storage apparatus becomes the copy source and the third storage apparatus becomes the copy destination.

CITATION LIST

Patent Literature

PTL 1: Japanese Unexamined Patent Application Publication No. 2006-65629

SUMMARY OF INVENTION

Technical Problem

After the second storage apparatus becomes the copy source, the second host apparatus writes the data to the second DVOL, and the second storage apparatus updates the update number and writes the JNL including the update number and the data to the second JVOL. The JNL is copied from the second JVOL to the third JVOL, and the third storage apparatus writes the data which the JNL in the third JVOL comprises to the third DVOL.

At this point, the starting point of the update numbers in the second storage apparatus can be considered to be the most recent update number in the JNLs which are already reflected in the second storage apparatus. This is because the second DVOL comprises the data until the order which the most recent update number shows.

However, there are some cases where this is not preferable. That type of case is, for example, the case where the latest update number in the JNLs which are already reflected in the second storage apparatus is older than the latest update number in the JNLs which are already reflected in the third storage apparatus. This is because, in that case, the status of the second DVOL is in the older status than the status of the third DVOL, which indicates that the data is copied from the DVOL in the older status to the DVOL in the newer status.

As described above, there are some cases where, if a failure occurs in the first storage apparatus, the operation is not continued appropriately.

This type of problem could also occur in cases where the first storage apparatus is terminated due to the causes other than a failure (e.g. the case where the first storage apparatus is suspended due to what is called a planned shutdown for maintenance).

Therefore, the purpose of this invention is to appropriately continue the operation in the asynchronous remote copy system in the multi-target method even if the first storage apparatus is terminated.

Solution to Problem

The asynchronous remote copy system comprises a first storage apparatus which comprises a first storage resource group and is connected to a first host apparatus, a second storage apparatus which comprises a second storage resource group and is connected to a second host apparatus, and a third storage apparatus which comprises a third storage resource group and is connected to a third host apparatus.

The first storage resource group comprises a first data volume which is the logical volume to which the data is written and a first journal storage resource which is the storage resource to which the journal of the data is written.

The second storage resource group comprises a second data volume which is the logical volume to which the data is written and a second journal storage resource which is the storage resource to which the journal of the data is written.

The third storage resource group comprises a third data volume which is the logical volume to which the data is written and a third journal storage resource which is the storage resource to which the journal of the data is written.

The first storage apparatus, if the data is written from the host apparatus to the first data volume, updates the update number which is the number updated each time the data is written to the data volume in the first storage resource group, creates a journal including the update number and the data, and writes the journal to the first journal storage resource.

Asynchronous remote copy in the multi-target method is performed. In the asynchronous remote copy, by a journal being transferred from the first storage apparatus to the second storage apparatus and being reflected in the second data volume, the data in the first data volume is written to the second data volume and, at the same time, by the journal being transferred from the first storage apparatus to the third storage apparatus and being reflected in the third data volume, the data in the first data volume is written to the third data volume. As more specifically described, for example, in asynchronous remote copy, the items below are performed.

(A1) A journal is copied from the first journal storage resource to the second journal storage resource.
(B1) The second storage apparatus reflects one or more journals in the second journal storage resource which are not reflected in the second data volume in order of the update numbers.
(A2) A journal is copied from the first journal storage resource to the third journal storage resource.
(B2) The third storage apparatus reflects one or more journals in the third journal storage resource which are not reflected in the third data volume in order of the update numbers.

If the first storage apparatus is terminated, the processing below is performed.

(x1) It is determined which of the update number which the journal recently reflected in the second storage apparatus comprises and the update number which the journal recently reflected in the third storage apparatus comprises is the newer.
(x2) It is determined whether one or more differential journals exist or not in the newer storage apparatus of the second and the third storage apparatuses (the storage apparatus comprising the update number determined at the (x1) to be the newer). One or more differential journals are the one or more journals from the journal comprising the update number next to the update number not determined at the (x1) to be the newer to the journal comprising the update number determined at the (x1) to be the newer.
(x3) If the result of the determination at the (x2) is positive, from the newer storage apparatus to the older storage apparatus (the storage apparatus which is not the newer storage apparatus among the second and the third storage apparatuses), one or more differential journals are copied.
(x4) The older storage apparatus reflects the one or more differential journals in the data volume in the older storage apparatus in order of the update numbers.

BRIEF DESCRIPTION OF DRAWINGS

FIG. 14 shows the configuration of meta information.

FIG. 16 shows the configuration of a JVOL valid bitmap 701A.

FIG. 17 shows the configuration of a DVOL valid bitmap 702A.

FIG. 18 shows the configuration of a JVOL management table 703A.

FIG. 19 shows the configuration of a JNL group management table 704A.

FIG. 20 shows the configuration of a pair management table 705A.

DESCRIPTION OF EMBODIMENTS

Hereinafter, with reference to the figures, some embodiments of this invention are described.

Note that, though the description below describes various types of information using the term of "a xxx table" and "a xxx bitmap," the various types of information may also be expressed by other data structures than tables and bitmaps. For showing the independence of the data structure, "a xxx table" and "a xxx bitmap" can be referred to as "xxx information."

Furthermore, though the description below mainly uses numbers as the identification information of various targets, other types of identification information (e.g. names) may also be adopted instead of numbers.

Embodiment 1

Figure 1:
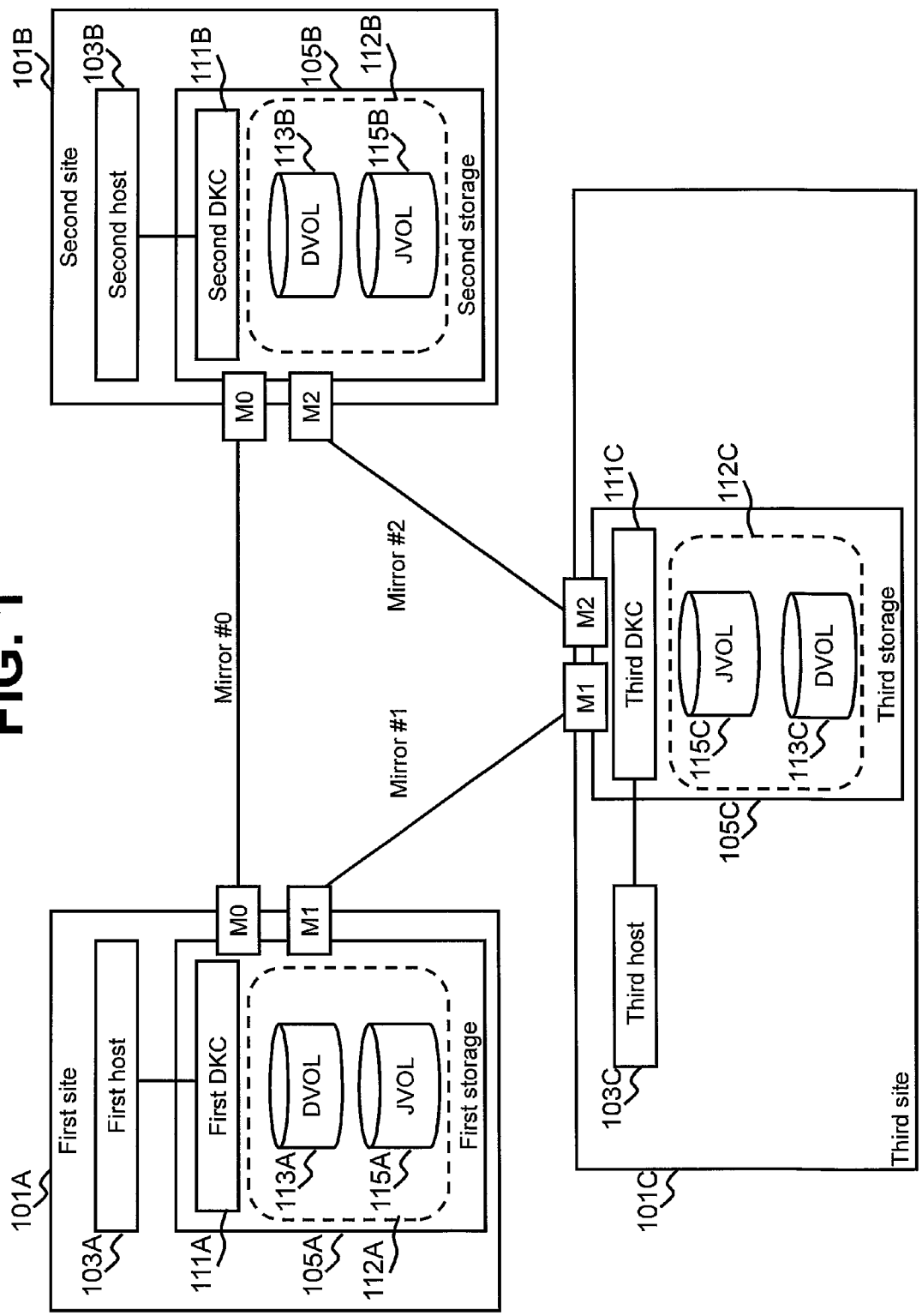
FIG. 1 shows the configuration of the asynchronous remote copy system related to the Embodiment 1 of this invention.

FIG. 1 shows the configuration of the asynchronous remote copy system related to the Embodiment 1 of this invention. Note that, in the description below, a journal is described as a "JNL," a data volume which is a logical volume to which the data is written is described as a "DVOL," a JNL volume which is a logical volume to which the JNL is written is described as a "JVOL," a host apparatus is described as a "host," a storage apparatus is described as a "storage," and a controller is described as a "DKC."

Three or more sites, for example, a first site 101A, a second site 101B, and a third site 101C exist. Hereinafter, for simplifying the description, a reference sign of an element which the first site 101A comprises is a combination of a parent number and a child sign "A," a reference sign of an element which the second site 101B comprises is a combination of a parent number and a child sign "B," and a reference sign of an element which the third site 101B comprises is a combination of a parent number and a child sign "C."

The first site 101A comprises a first storage 105A and a first host 103A connected to the first storage 105A. The first storage 105A includes a first DKC 111A and a first JNL group 112A. One JNL group 112A includes a DVOL 113A and a JVOL 115A.

The second and the third sites 101B and 101C comprise the same configuration as the first site 101A.

The storages 105A and 105B are physically connected to each other via an exclusive path (or a communication network). The storages 105B and 105C are also physically connected to each other via an exclusive path (or a communication network). The storages 105A and 105C are also physically connected to each other via an exclusive path (or a communication network).

Figure 2:
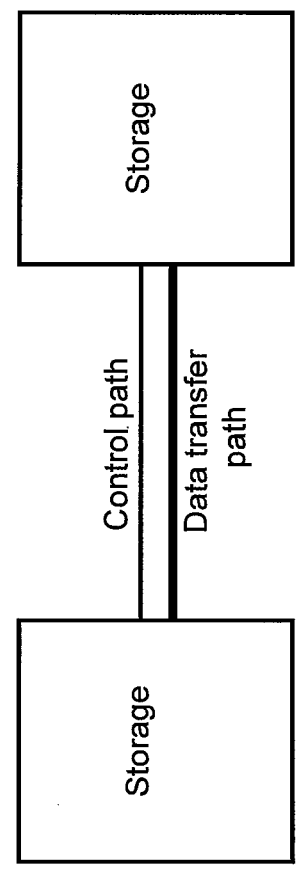
FIG. 2 shows paths between the storage apparatuses.

The paths connecting the storages are, as shown in FIG. 2, a control path and a data transfer path. The control path is a path necessary for difference resync (described later). As more specifically described, for example, in the difference resync processing, the control path is a path through which a sequential number acquisition request (described later) is passed. The data transfer path is a path through which the JNLs are passed. Both the control path and the data transfer path are the paths capable of two-way communication.

FIG. 1 is referred to again.

Logical connections between JNL groups named "mirrors" exist. According to FIG. 1, the connection between the JNL groups 112A and 112B is a mirror #0 (a mirror to which a number "0" is assigned (M0)), the connection between the JNL groups 112A and 112C is a mirror #1 (a mirror to which a number "1" is assigned (M1)), and the connection between the JNL groups 112B and 112C is a mirror #2 (a mirror to which a number "2" is assigned (M2)).

Hereinafter, the overview of the processing related to this embodiment is described. Note that, in the description below, unless otherwise specified, there is assumed to be one first JNL group 112A, one second JNL group 112B, and one third JNL group 112C respectively.

Figure 3:
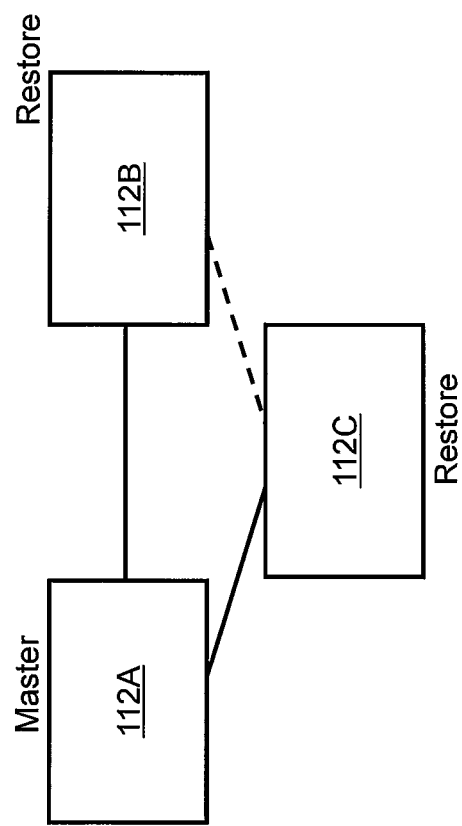
FIG. 3 shows the statuses and mirror validity/invalidity of JNL groups 112A, 112B, and 112C in FIG. 6.

In the remote copy system related to this embodiment, the asynchronous remote copy in the multi-target method is supposed to be performed, and the first site 101A is the operation site. In this case, as shown in FIG. 3, the status of the first JNL group 112A is "Master," and the status of the second and the third JNL groups 112B and 112C is "Restore." The status "Master" indicates that the JNL group is the copy source. The status "Restore" indicates that the JNL groups are the copy destinations. Note that, in FIG. 3 (and in the subsequent FIG. 4 and FIG. 5), the mirror shown by a dashed line is an invalid mirror while a mirror shown by a solid line is a valid mirror.

Figure 6:
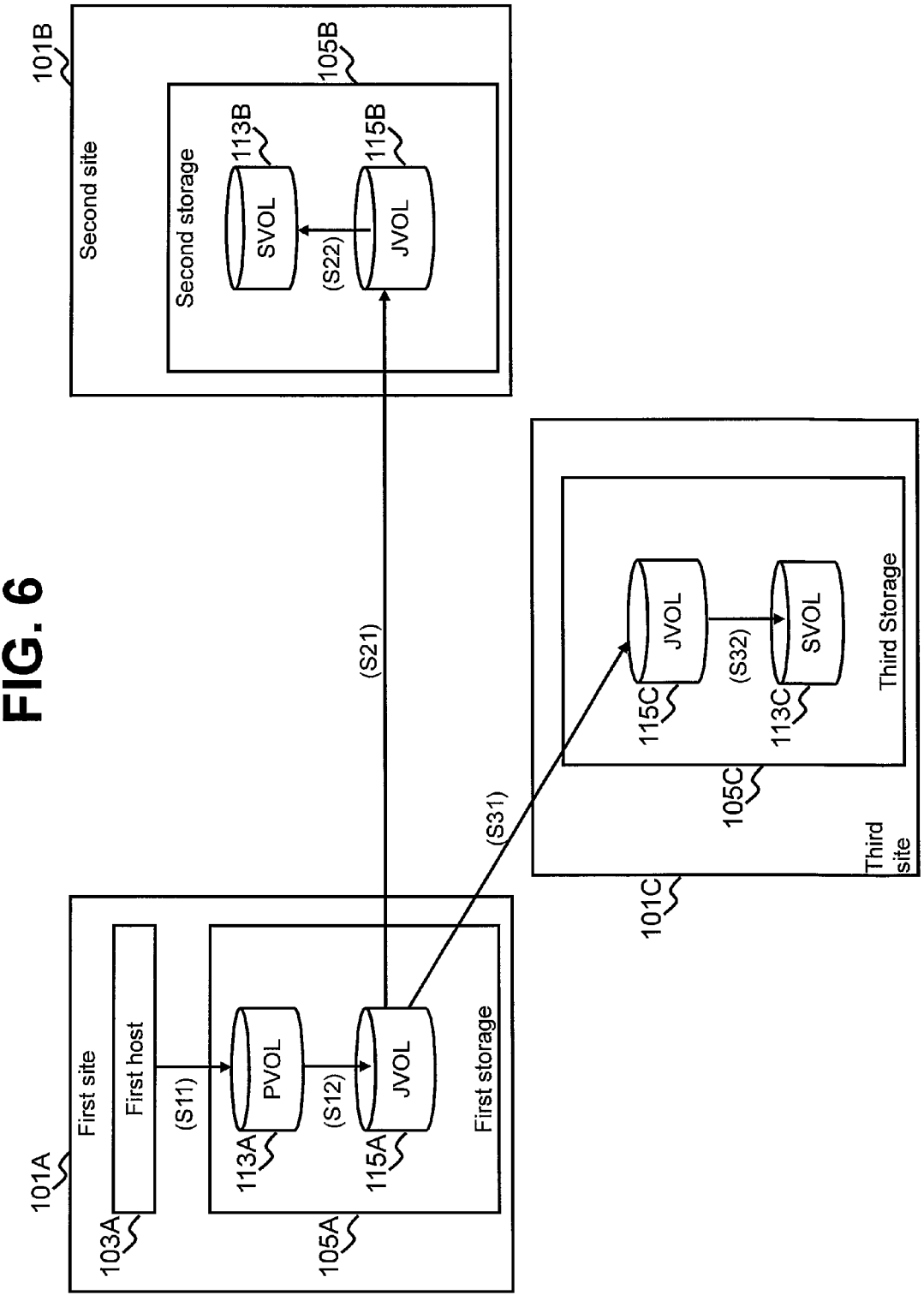
FIG. 6 shows the overview of the asynchronous remote copy in the multi-target method.

Therefore, as shown in FIG. 6, the first DVOL 113A is a primary DVOL (hereinafter referred to as a PVOL), and the second and the third DVOLs 113B and 113C are secondary DVOLs (hereinafter referred to as SVOLs).

As shown in FIG. 6, in the first site 101A which is an operation site, the first host 103A, in accordance with the performed operation, writes the data to the PVOL 113A (S11). The first storage 105A updates the sequential number (hereinafter referred to as a SEQ#), creates a JNL comprising the updated SEQ# and the data written to the PVOL 113A, and writes the created JNL to the first JVOL 115A (S12). The SEQ# is the number updated each time the data is written to the first JNL group 112A (the DVOL in the first JNL group 112A) (e.g. incremented by 1 (or decremented by 1)).

The second storage 105B reads the JNL from the first JVOL 115A, and writes the read JNL to the second JVOL 115B (S21). The second storage 105B reflects the one or more JNLs in the second JVOL 115B that are not reflected in the SVOL 113B in ascending order of the SEQ#'s (S22). As more specifically described, the second storage 105B writes the data which the JNLs in the second JVOL 115B that are not reflected comprise to the SVOL 113B. By this method, the data written to the PVOL 113A is considered to have been copied to the SVOL 113B.

The third storage 105C reads the JNL from the first JVOL 115A, and writes the read JNL to the third JVOL 115C (S31). The third storage 105C reflects the one or more JNLs in the third JVOL 115C that are not reflected in the SVOL 113C in ascending order of the SEQ#'s (S32). As more specifically described, the third storage 105C writes the data which the JNLs in the third JVOL 115C that are not reflected comprise to the SVOL 113C. By this method, the data written to the PVOL 113A is considered to have been copied to the SVOL 113C.

For one copy source JNL group, more than two copy destination JNL groups may also exist.

According to this embodiment, the JVOLs included in one copy source JNL group are common to multiple copy destination JNL groups. In another expression, the number of JVOLs included in one copy source JNL group does not depend on the number of copy destination JNL groups. The JNL copy (transfer) between the storage apparatuses is realized by the copy destination storage apparatus(es) reading JNLs from the JVOLs in the copy source storage apparatus. According to this characteristic, the storage capacity consumed in the first storage 105A can be saved.

Figure 7:
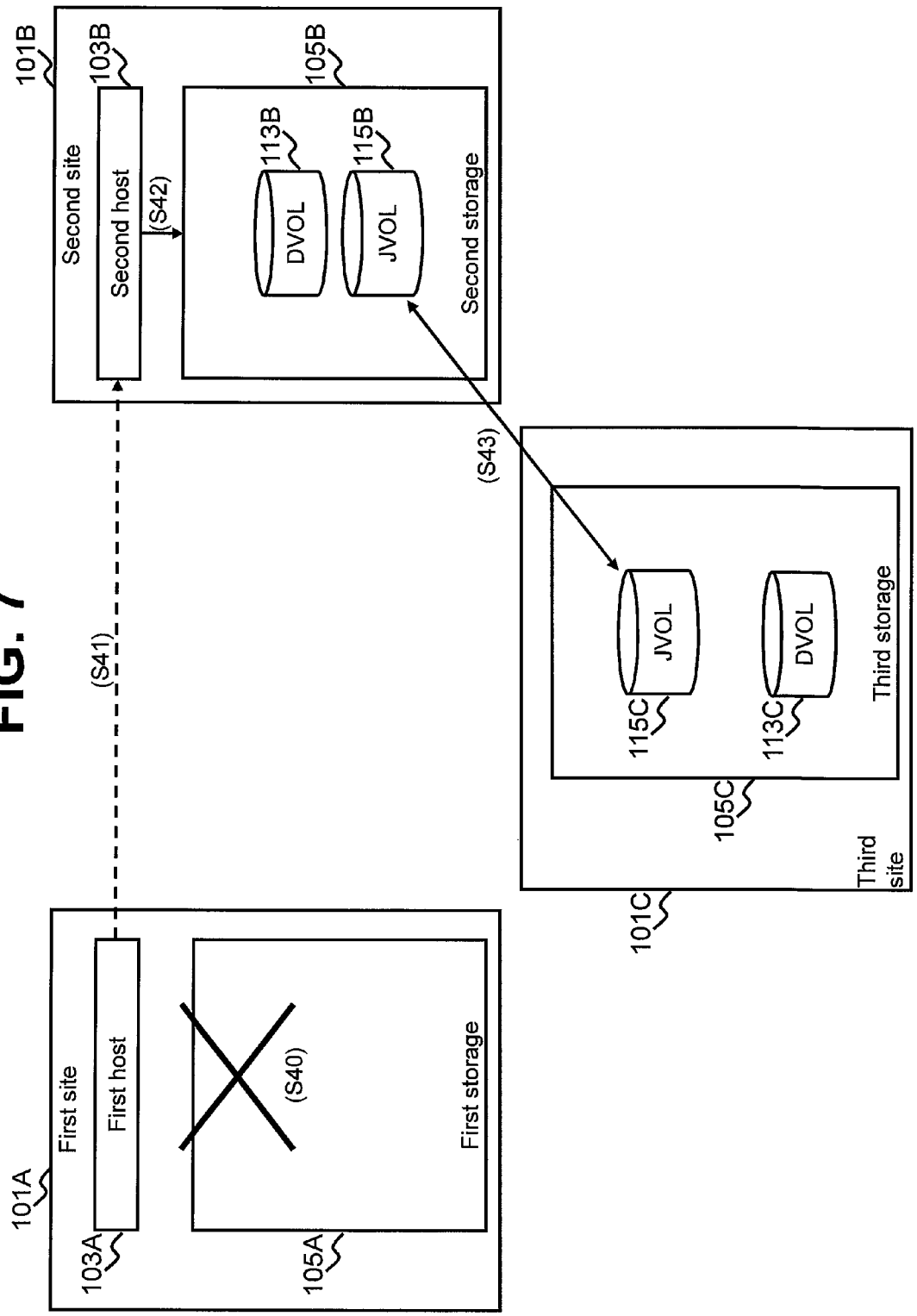
FIG. 7 shows a part of the processing performed if a failure occurs in a first storage 105A.

Meanwhile, as shown in FIG. 7, in the first site 101A which is the operation site, a failure is assumed to have occurred in the first storage 105A (S40). In this case, the operation site is switched from the first site 101A to the second site 101B. As more specifically described, a failover from the first host 103A to the second host 103B is performed (S41). The second host 103B transmits a specified command to the second storage 105B (S42).

Figure 4:
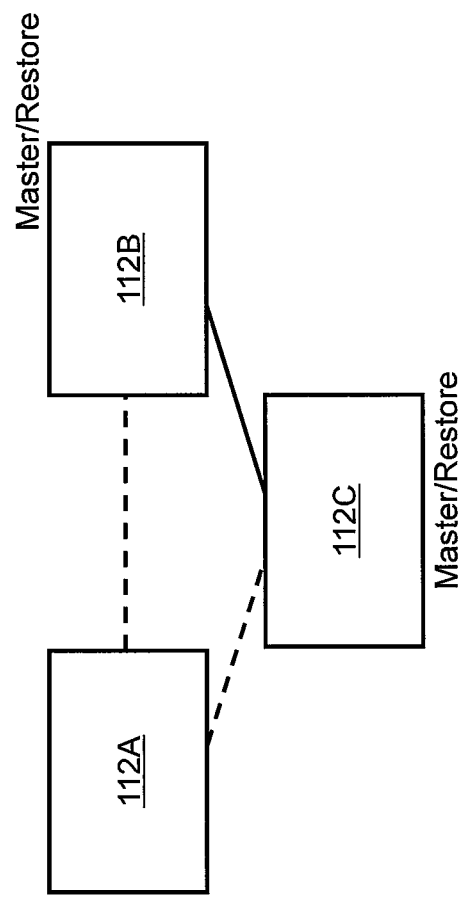
FIG. 4 shows the statuses and mirror validity/invalidity of JNL groups 112B and 112C in FIG. 7.

The second storage 105B receives the specified command. In this case, as shown in FIG. 4, the mirror #2 is made valid by the storage 105B and/or 105C, and the status of the second and the third JNL groups 112B and 112C become "Master/Restore" temporarily. This is for exchanging the SEQ# between the second storage 105B and the third storage 105C for the determination at S43. The status "Master/Restore" indicates that the JNL groups are both the copy source and the copy destination. The status of the second and the third JNL groups 112B and 112C is "Master/Restore" until difference resync (described later) is completed.

The second storage 105B, in response to the specified command, requires the SEQ# which the latest JNL reflected in the third storage 105C comprises (hereinafter referred to as the SEQ#(3)) of the third storage 105C (transmits a request for the acquisition of the sequential number) and, as the third storage 105C responds to the request, receives the SEQ#(3) from the third storage 105C. The second storage 105B determines which of the SEQ#(3) and the SEQ# which the latest JNL reflected in the second storage 105B comprises (hereinafter referred to as the SEQ#(2)) is the newer. In accordance with the result of the determination, the difference resync shown in FIG. 8 and FIG. 9 is performed.

Figure 8:
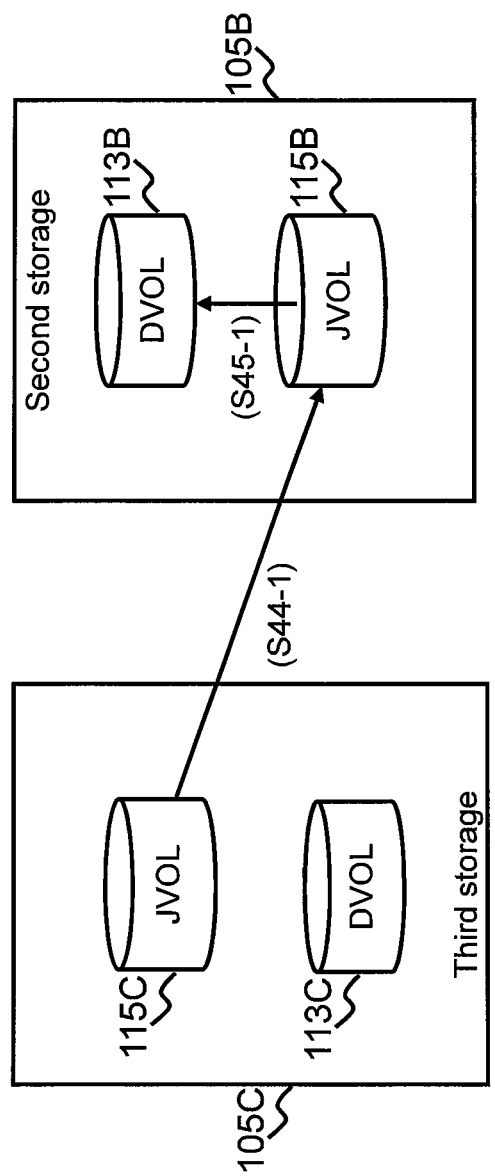
FIG. 8 shows the overview of difference resync from a third storage 105C to a second storage 105B.

That is, if the SEQ#(3) is newer than the SEQ#(2), as shown in FIG. 8, the second storage 105B reads one or more differential JNLs from the third JVOL 115C, and writes the same to the second JVOL 115B (S44-1). The "one or more differential JNLs" referred to at this point are one or more JNLs from the JNL comprising the SEQ#next to the SEQ# (2) to the JNL comprising the SEQ#(3). The second storage 105B reflects the one or more differential JNLs in the second JVOL 115B in the second DVOL 113B, starting with the journal comprising the SEQ#next to the SEQ#(2), in ascending order of the SEQ#'s (S45-1). By this method, the data in the second DVOL 113B matches the data in the third DVOL 113C at the start of the difference resync.

Figure 9:
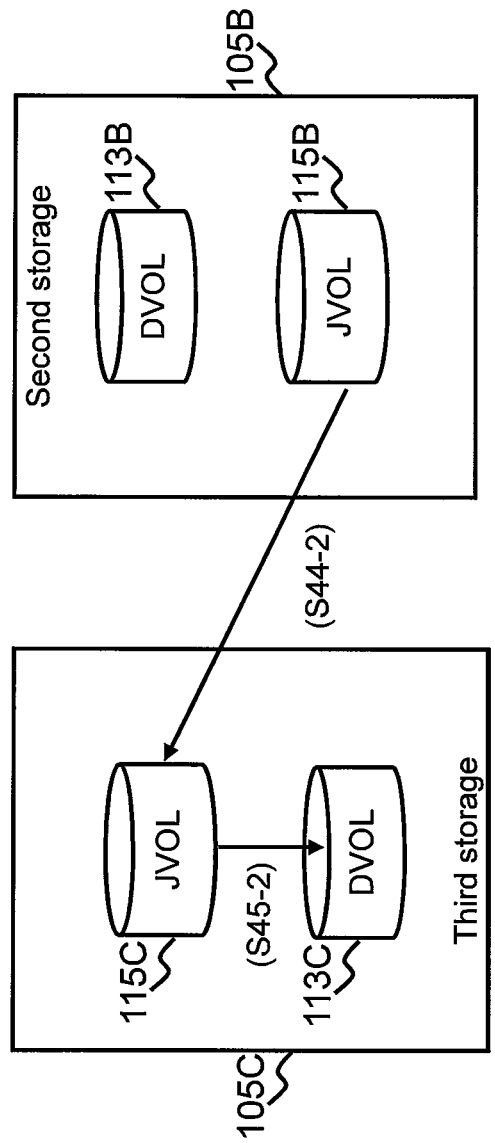
FIG. 9 shows the overview of difference resync from the second storage 105B to the third storage 105C.

Meanwhile, if the SEQ#(2) is newer than the SEQ#(3), as shown in FIG. 9, the second storage 105B writes one or more differential JNLs in the second JVOL 115B to the third JVOL 115C (S44-2). The "one or more differential JNLs" referred to at this point are one or more JNLs from the JNL comprising the SEQ#next to the SEQ#(3) to the JNL comprising the SEQ#(2). The third storage 105C reflects the one or more differential JNLs in the third JVOL 115C in the third DVOL 113C, starting with the journal comprising the SEQ#next to the SEQ#(3), in ascending order of the SEQ#'s (S45-2). By this method, the data in the third DVOL 113C matches the data in the second DVOL 113B at the start of the difference resync.

Figure 5:
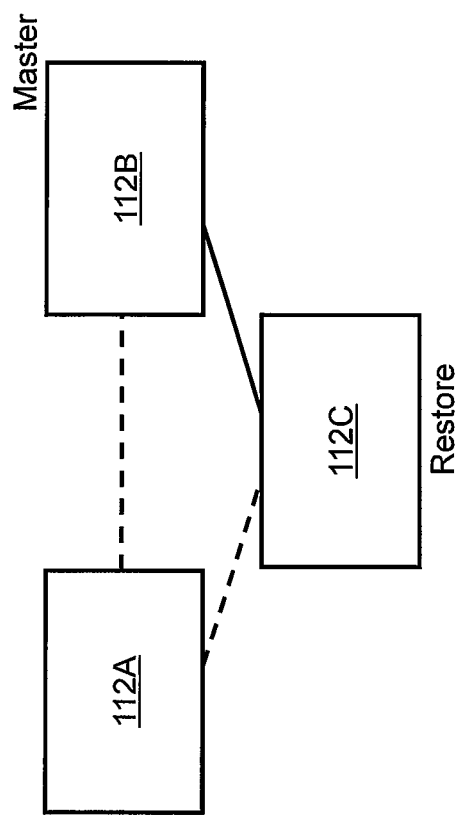
FIG. 5 shows the statuses and mirror validity/invalidity of JNL groups 112B and 112C in FIG. 10.
Figure 10:
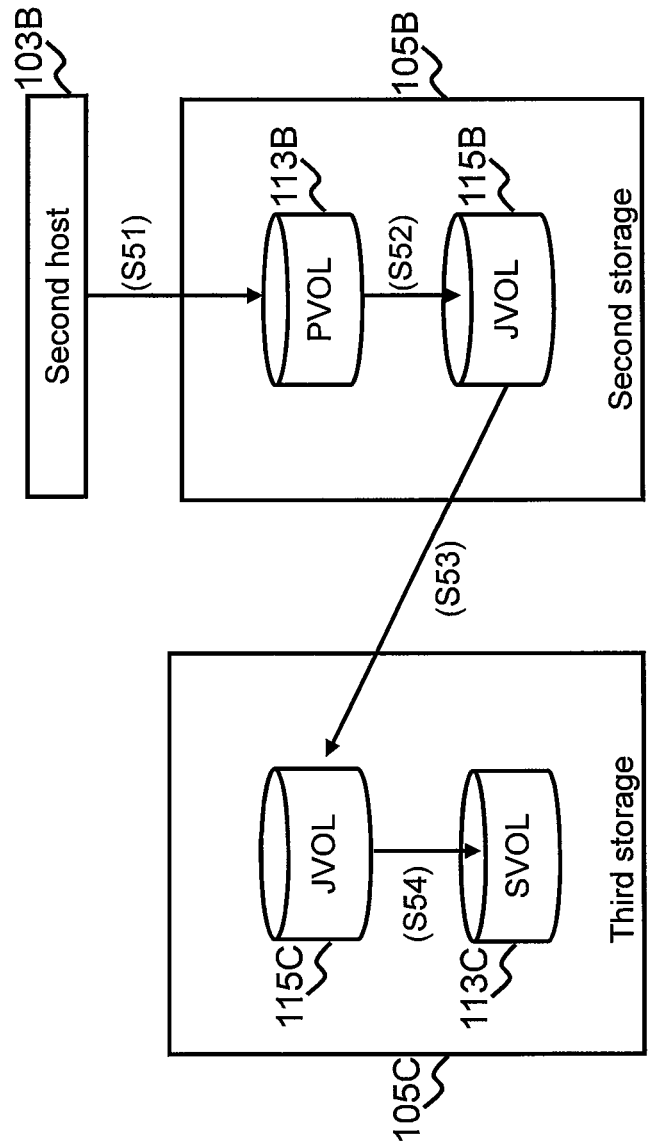
FIG. 10 shows the overview of the continuation of the operation after the difference resync is completed.

After that, the second site 101B becomes the operation site, and the operation is continued. As more specifically described, as shown in FIG. 5, the status of the second JNL group 112B becomes the "Master," and the status of the third JNL group 112C becomes the "Restore." Therefore, as shown in FIG. 10, the second DVOL 113B becomes the PVOL and the third DVOL 113C becomes the SVOL. The second host 103B writes the data to the PVOL 113B (S51). The second storage 105B updates the SEQ#'s, creates JNLs comprising the SEQ#'s and the data written to the PVOL 113B, and writes the created JNLs to the second JVOL 115B (S52). The third storage 105C reads the JNLs from the second JVOL 115B, and writes the read JNLs to the third JVOL 115C (S53). The third storage 105C reflects the JNLs in the third JVOL 115C in the SVOL 113C in ascending order of the SEQ#'s (S54).

According to this embodiment, the second storage 105B acquires the SEQ#(3) from the third storage 105C, determines which of the SEQ#(3) and the SEQ#(2) is the newer and, in accordance with the result of the determination, controls from which to which of the second and the third storages 105B and 105C the one or more differential JNLs should be transferred. By this method, even if a failure occurs in the first storage 105A, the operation can be continued appropriately. Furthermore, as one or more differential JNLs to be transferred are merely the difference between the second and the third storages 105B and 105C, the number of transferred JNLs can be kept small.

Hereinafter, this embodiment is described in details. In this case, though the description is made with reference to the elements in the first site 101A as an example typically, unless otherwise specified, the elements in the second and the third sites 101B and 101C are practically the same as the elements in the first site 101A.

Figure 11:
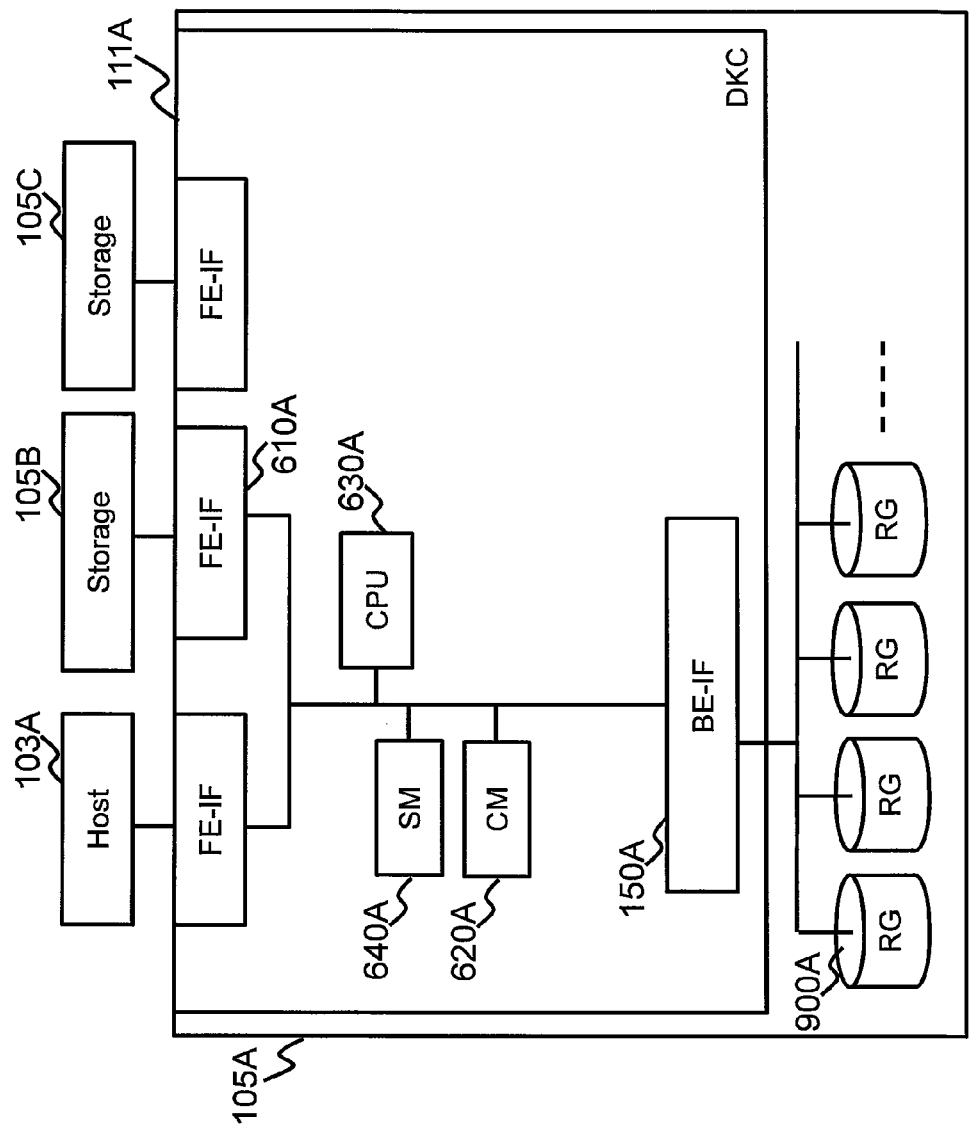
FIG. 11 shows the configuration of the first storage 105A.

FIG. 11 shows the configuration of the first storage 105A.

The first storage 105A comprises the first DKC 111A and multiple RAID (Redundant Array of Independent (or Inexpensive) Disks) groups (hereinafter referred to as RGs) 900A. An RG 900A is configured of multiple HDDs (Hard Disk Drives). Instead of HDDs, other physical storage devices such as flash memory may also be adopted. One or multiple logical volumes are based on one RG 900A. A logical volume is, for example, the above-mentioned DVOL or JVOL, both of which may be an actual logical volume which is a part of the storage space in the RG 900A or may also be a virtual logical volume to which actual areas are dynamically assigned (a virtual logical volume complying with the Thin Provisioning technology) from a pool configured based on one or more RGs 900A (the storage area configured of multiple actual areas).

The DKC 111A comprises multiple front-end interface apparatuses (hereinafter referred to as FE-IFs) 610A, a back-end interface apparatus (hereinafter referred to as a BE-IF) 150A, a cache memory (hereinafter referred to as a CM) 620A, a shared memory (hereinafter referred to as an SM) 640A, and one or more CPUs (Central Processing Units) 630A connected to the same. The processing of the DKC 111A may be performed by the CPU 630A executing one or more computer programs, and at least part of the processing may also be performed by a hardware circuit.

To the multiple FE-IFs 610A, the first host 103A, the second and the third storages 105B and 105C are connected. The DKC 111A (CPU 630A), via the FE-IFs 610A, communicates with the first host 103A and the second and the third storages 105B and 105C.

To the BE-IF 150A, the multiple RGs 900A are connected. The DKC 111A (CPU 630A), via the BE-IF 150A, writes the data (or JNLs) to the RG 900A which is the base of the write destination logical volume (e.g. the first DVOL 113A or the first JVOL 115A).

The CM 620A stores the data (and JNLs) written to the RGs 900A and the data (and JNLs) read from the RGs 900A The SM 640A stores various types of control information to be used for controlling the processing of the DKC 111A.

The CPU 630A controls the processing which the DKC 111A performs.

The configuration of the first storage 105A is as described above. Note that the DKC 111A may also comprise other types of configuration as well as the configuration shown in FIG. 11. Furthermore, the configuration of the second and the third storages 105B and 105C is practically the same as the configuration of the first storage 105A. The configuration of the DKC 111B or 111C may also be different from the configuration of the DKC 111A.

Figure 12:
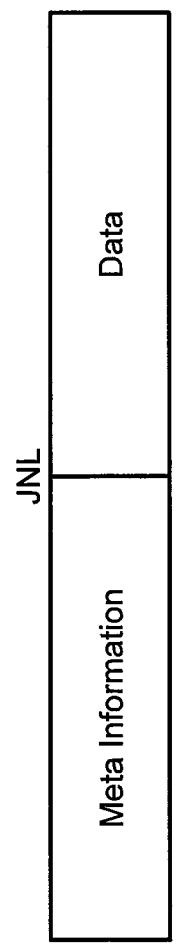
FIG. 12 shows the configuration of a JNL.
Figure 13:
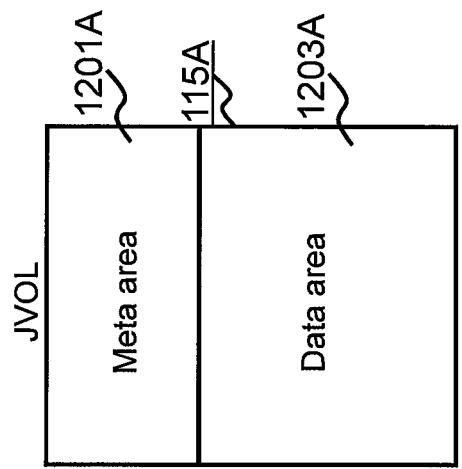
FIG. 13 shows the configuration of a JVOL 115A.

FIG. 12 shows the configuration of a JNL, and FIG. 13 shows the configuration of the JVOL 115A.

A JNL is configured of meta information and data.

The JVOL 115A is configured of a meta area 1201A and a data area 1203A. The meta area 1201A stores meta information, and the data area 1203A stores data. Note that the meta area 1201A may also exist in other storage resources than RGs 900A, such as in the CM 620A.

FIG. 14 shows the configuration of the meta information.

The meta information is the management information related to the data included in the JNL. The meta information, for example, includes the information below.

SEQ#,
Write destination information (information indicating where in the DVOL the data is written),
PVOL#(copy source DVOL number),
SVOL#(copy destination DVOL number), and
The information indicating the location in the JVOL of the data corresponding to this meta information (this information is included when the JNL is written to the JVOL).

Normally, the first DKC 111A manages the SEQ#'s. The SEQ#exists in each JNL group 112A. The first DKC 111A, if writing the data to the DVOL 113A in a certain JNL group 112A, updates the SEQ#corresponding to the JNL group 112A. The SEQ#'s are, for example, stored in the SM 640A or on other storage resources.

If a failure occurs in the first storage 105A and the second site 101B becomes the operation site, the second storage 105B manages the SEQ# of each JNL group 112B.

Figure 15:
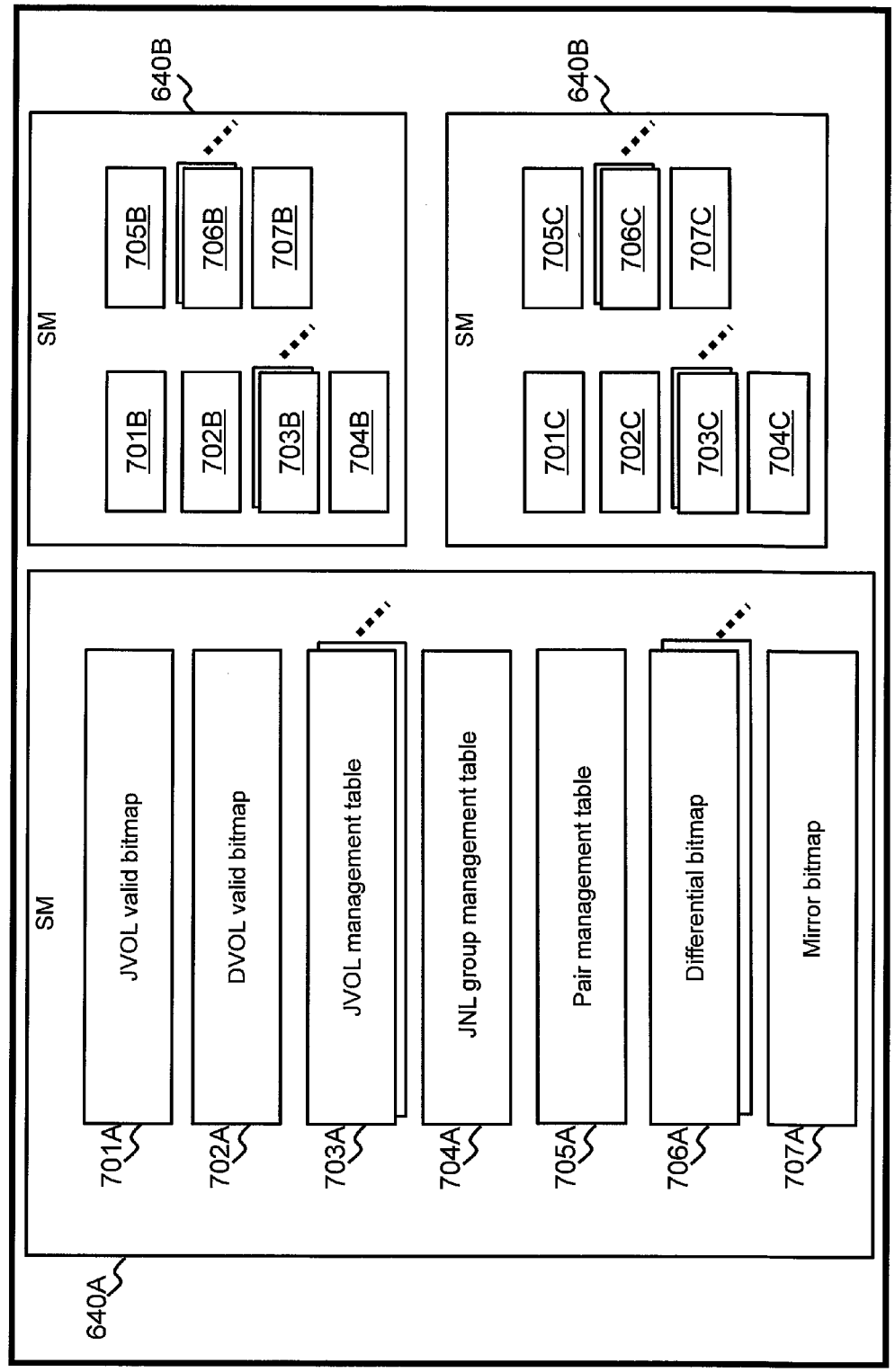
FIG. 15 shows the control information which each storage comprises.

As shown in FIG. 15, SM 640A, as control information, for example, stores a JVOL valid bitmap 701A, a DVOL valid bitmap 702A, a JVOL management table 703A, a JNL group management table 704A, a pair management table 705A, a differential bitmap 706A, and a mirror bitmap 707A. Similarly, the SM 640B in the second storage 105B stores the control information 701B to 707B, and the SM 640C in the third storage 105C stores the control information 701C to 707C. Hereinafter, the control information 701A to 707A is described as a representative.

A JNL group, for example, can comprise a maximum of 64 logical volumes. The JVOL valid bitmap 701A, as shown in FIG. 16, comprises 64 bits per JNL group. If the n-th (n is an integer equal to or larger than 0 and equal to or smaller than 63) logical volume is the JVOL 115A, the n-th bit is on (e.g. 1).

The DVOL valid bitmap 702A, as shown in FIG. 17, comprises 64 bits per JNL group. If the n-th (n is an integer equal to or larger than 0 and equal to or smaller than 63) logical volume is the JVOL 115A, the n-th bit is on (e.g. 1).

The JVOL management table 703A exists in each JNL group 112A. The table 703A, as shown in FIG. 18, for each JVOL 115A, comprises the information indicating the initial address of the meta area, the information indicating the size of the meta area, the information indicating the initial address of the data area, and the information indicating the size of the data area. That is, the table 703A, for each JVOL 115A, indicates from where to where the meta area is and from where to where the data area is.

The JNL group management table 704A comprises the information related to the JNL groups. As more specifically described, for example, the table 704A, as shown in FIG. 19, for each JNL group, comprises the information below.
JNL group #1001A indicating the JNL group number,
Status 1002A indicating the status of the JNL group,
Mirror #1003A indicating the number of the mirrors exist in the remote copy system related to this embodiment,
Corresponding JNL group #1004A indicating the corresponding JNL group number,
Corresponding storage #1005A indicating the number of the storage apparatus comprising the corresponding JNL group,
Purged SEQ#1006A indicating the SEQ#'s which recently purged JNLs comprise,
Purgeable SEQ#1007A indicating the SEQ#'s which JNLs that can be purged comprise, and
Read SEQ#1008A indicating the SEQ#'s which recently read JNLs comprise.

The pair management table 705A comprises the information related to the pairs of DVOLs. As more specifically described, for example, the table 705A, as shown in FIG. 20, for each DVOL 113A, comprises the information below.
DVOL #1101A indicating the number of DVOL 113A,
JNL group #1102A indicating the number of the JNL group 112A including the DVOL 113A,
Copy destination volume #1103A indicating the number of the copy destination DVOL of the DVOL 113A, and
Status 1104A indicating the pair status of the DVOL 113A for the pair of the DVOL 113A and the copy destination DVOL.

The differential bitmap 706A comprises bits for each DVOL 113A. The DVOL 113A is configured of multiple blocks. The differential bitmap 706A indicates which block of the DVOL 113A is updated. That is, the bits which the differential bitmap 706A comprises correspond to the blocks. The differential bitmap 706A is updated when the pair status of the DVOL 113A is a specified status. As more specifically described, for example, the DKC 111A, if the pair status of a certain DVOL 113A is a specified status and, at the same time, if the data is written to a certain block in the DVOL 113A, changes the bit corresponding to the block in the differential bitmap 706A corresponding to the DVOL 113A to on (e.g. 1).

The mirror bitmap 707A indicates what mirrors are valid and what mirrors are invalid. As more specifically described, the mirror bitmap 707A comprises multiple bits corresponding to multiple mirrors. For example, usually, the mirrors #0 and #1 are valid and the mirror #2 is invalid (refer to FIG. 6). In this case, the bits corresponding to the mirror #0 and the mirror #1 are on (e.g. 1) and the bit corresponding to the mirror #2 is off (e.g. 0). Furthermore, if a failure occurs in the first storage 105A, the mirrors #0 and #1 are invalid and the mirror #2 is valid (refer to FIG. 10). In this case, the bits corresponding to the mirrors #0 and #1 are off, and the bit corresponding to the mirror #2 is on.

Hereinafter, several types of processing performed in this embodiment are described.

Initial Copy

Before the asynchronous remote copy from the PVOL to the SVOL (remote copy by utilizing JNLs) is started, the data which the PVOL comprises (the contents of the PVOL) and the data which the SVOL comprises (the contents of the SVOL) must match each other. For ensuring that, initial copy is performed. "Initial copy" is the copy for making the contents of the PVOL and the contents of the SVOL match each other.

Figure 21:
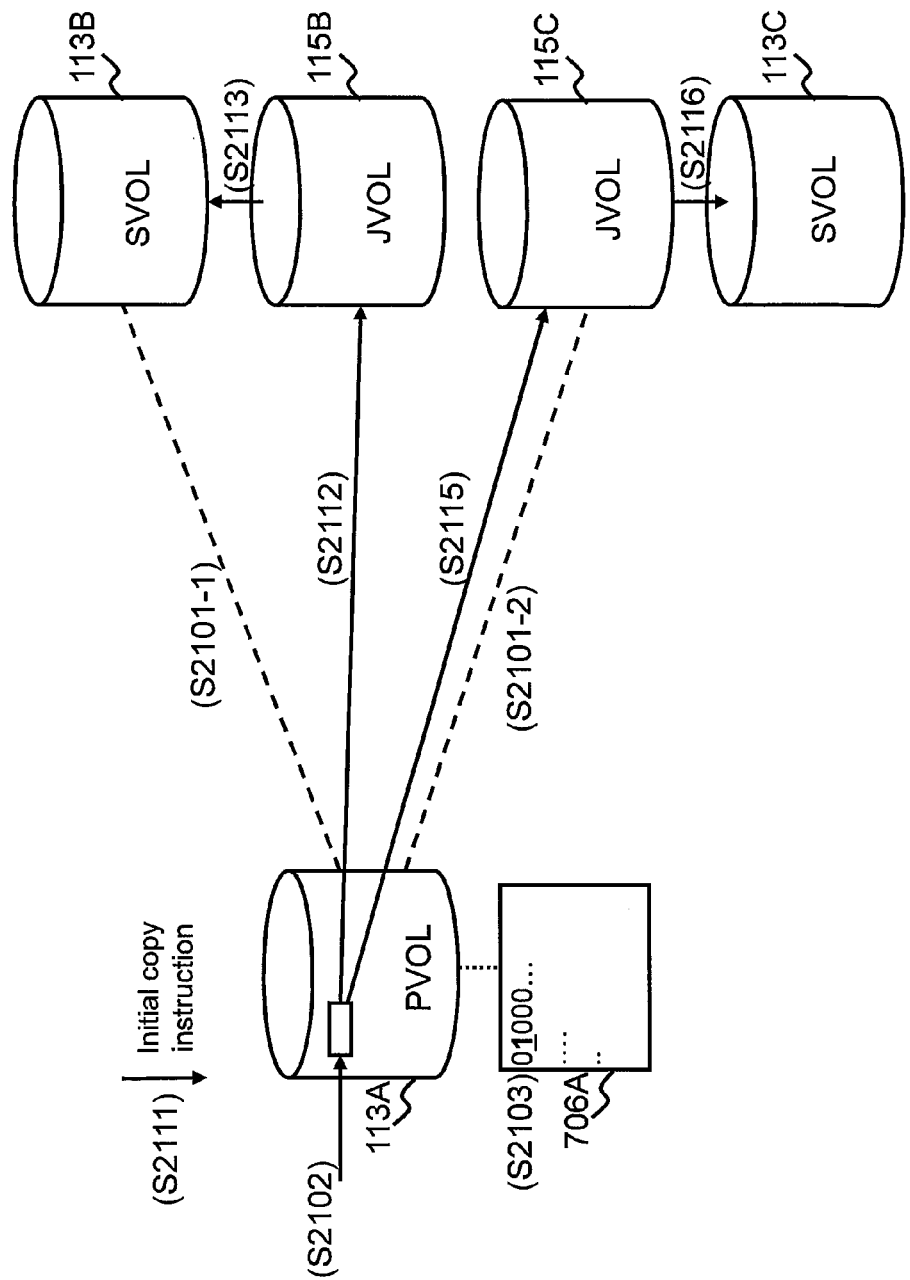
FIG. 21 shows the flow of differential management and initial copy.

As shown in FIG. 21, there are some cases where both the status of the PVOL 113A-SVOL 113B pair and the status of the PVOL 113A-SVOL 113C pair are considered to be suspended (S2101-1, S2101-2). As more specifically described, the pair status of the PVOL 113A becomes "PSUS" (primary suspend), and the pair status of the SVOLs 113B and 113C becomes "SSUS." In this case, the first DKC 111A resets the SEQ#corresponding to the JNL group 112A including the PVOL 113A to a specified value (e.g. 0).

In this case, the first DKC 111A, even if the data is written to the PVOL 113A, does not create a JNL comprising the data. The first DKC 111A, if the data is written to a certain write destination block in the PVOL 113A (S2102) and if the pair status of the PVOL 113A is "PSUS," changes the bit corresponding to the write destination block in the differential bitmap 706A corresponding to the PVOL 113A to on (e.g. 1) (S2103). If the pair status of the PVOL 113A is "PSUS," each time the data is written to a block which is not updated yet in the PVOL 113A, S2103 is performed.

The first DKC 111A receives an initial copy instruction from the first host 103A (or a management terminal not shown in the figure connected to the first DKC 111A) (S2111). The reception of the initial copy instruction is the timing for the start of the initial copy. The initial copy, which may also be performed in parallel for the first pair (the PVOL 113A-SVOL 113B pair) and the second pair (the PVOL 113A-SVOL 113C pair), is not performed in parallel in this embodiment, and is performed sequentially. Therefore, the concentration of access to the PVOL 113A can be reduced.

For example, firstly, as shown in FIG. 21, the initial copy is performed for the first pair. That is, the first DKC 111A identifies the block corresponding to the bit which is on in the differential bitmap 706A (the block in the PVOL 113A corresponding to the differential bitmap 706A). Then, the first DKC 111A creates a JNL comprising the data in the identified block, and, without storing the created JNL in the first JVOL 115A, writes the same to the second JVOL 115B (S2112). The second DKC 111B reflects the JNLs in the second JVOL 115B in the SVOL 113B (S2113). For all the updated blocks in the PVOL 113A (the blocks corresponding to the bits which are on), S2112 and S2113 are performed.

After the initial copy for the first pair is completed, the initial copy for the second pair is performed. That is, the first DKC 111A creates a JNL comprising the data in the updated block in the PVOL 113A and, without storing the created JNL to the first JVOL 115A, writes the same to the third JVOL 115C (S2115). The third DKC 111C reflects the JNL in the third JVOL 115C in the SVOL 113C (S2116). For all the updated blocks in the PVOL 113A, S2115 and S2116 are performed.

Write Processing and JNL Creation Processing

Figure 22:
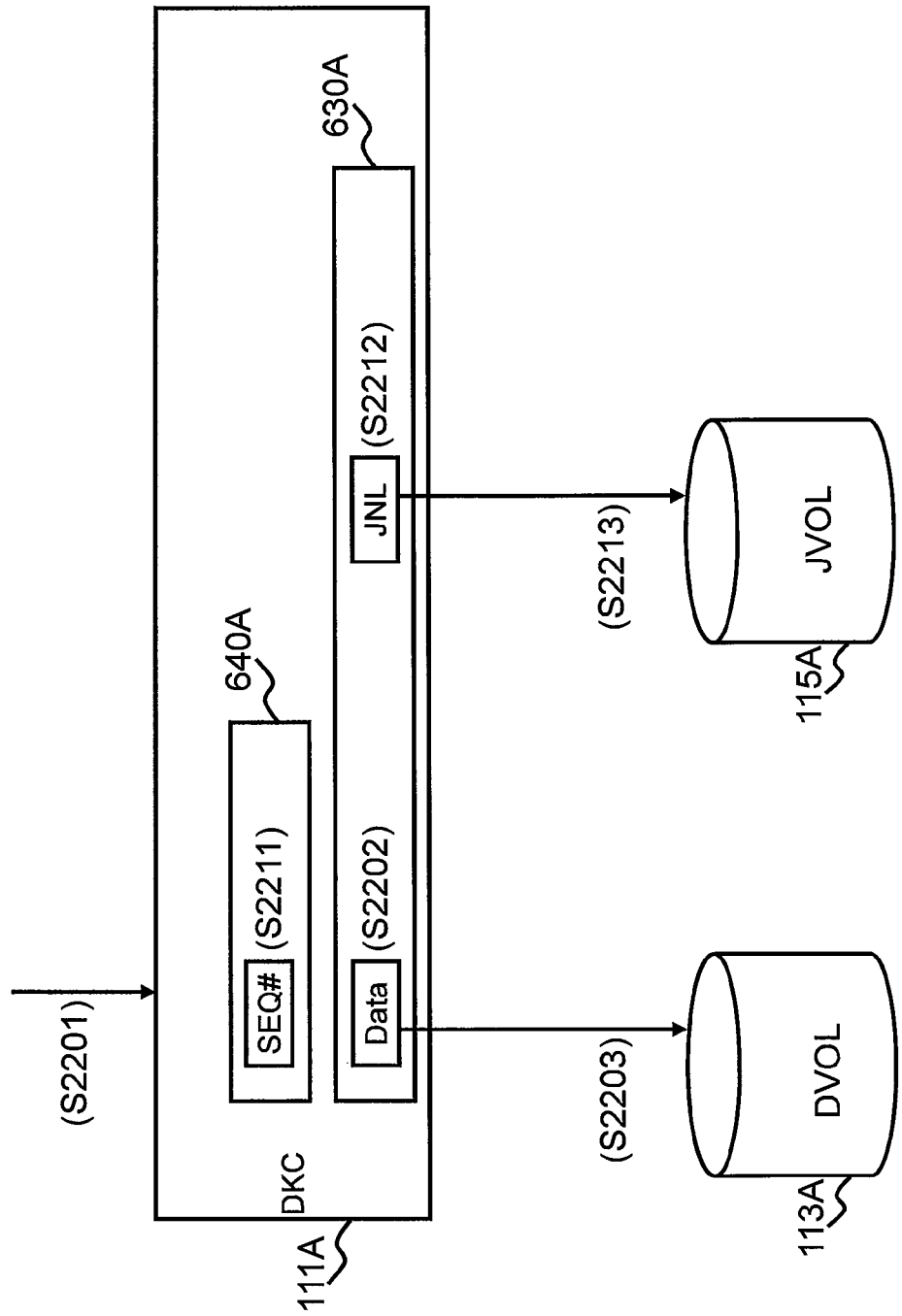
FIG. 22 shows the flow of the write processing in the first storage 105A.

As shown in FIG. 22, the first DKC 111A receives a write request specifying a PVOL 113A from the first host 103A (S2201), secures a CM area (cache memory area) in the CM 630A and, in the secured area, writes the data complying with the write request (write target data) (S2202). The first DKC 111A, at this point, may respond the write completion to the first host 103A.

The first DKC 111A writes the write target data in the CM 630A to the PVOL 113A (S2203).

The first DKC 111A updates the SEQ#corresponding to the JNL group 112A including the PVOL 113A (S2211). The first DKC 111A creates a JNL (S2212), and writes the created JNL to the first JVOL 115A. The JNL created at S2212 comprises the meta information including the SEQ#updated at S2211 (or the SEQ#before the update) and the data written to the PVOL 113A at S2203. The data may be the data read from the PVOL 113A or may also be the data remaining in the CM 630A.

JNL Read Processing

With reference to the second DKC 111B reading JNLs from the first JVOL 115A as an example, the JNL read processing is described.

Figure 23:
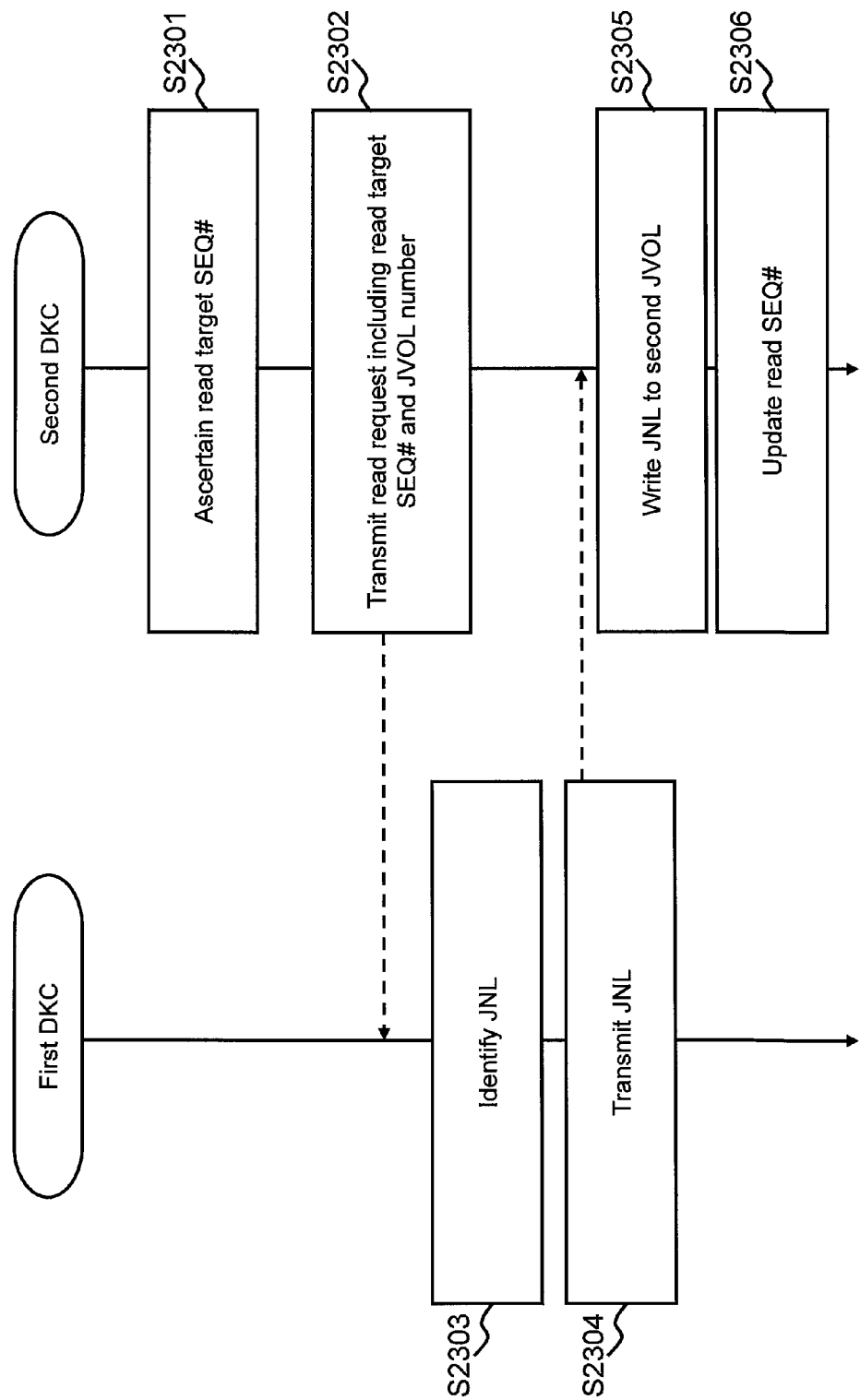
FIG. 23 shows the flow of the JNL read processing.

As shown in FIG. 23, the second DKC 111B ascertains the read target SEQ#(S2301). The "read target SEQ#" is the SEQ#included in the JNL to be read. The read target SEQ# is, as more specifically described, the value where 1 is added to the value indicated by the read SEQ#1008B corresponding to the mirror #0 in the JNL group 112B (the information 1008B in the JNL group management table 704B) (that is, the value next to the value indicated by the read SEQ#1008B).

The second DKC 111B transmits a read request to the first storage 105A (S2302). The read request comprises the read target SEQ# ascertained at S2301 and the number of the JVOL 115A to be the read source of the JNL (or the LUN (Logical Unit Number) corresponding to the same). The number of the JVOL 115A is, for example, identified from the control information which the SM 640B stores. As more specifically described, for example, the control information comprises the number of the JVOL 112A which the JNL group 112A corresponding to the JNL group 112B comprising the SVOL 113B comprises.

The first DKC 111A receives the read request from the second DKC 111B. The first DKC 111A, in accordance with the read request, identifies the JNL comprising the read target SEQ# from the read source JVOL 115A (S2303). The first DKC 111A reads the identified JNL from the read source JVOL 115A, and transmits the read JNL, via the data transfer path between the first and the second storages 105A and 105B, to the second DKC 111B (S2304).

The second DKC 111B receives the JNL from the first DKC 111A, and writes the received JNL to the second JVOL 115B (S2305). The second DKC 111B changes the value indicated by the read SEQ#1008B corresponding to the mirror #0 of the JNL group 112B comprising the SVOL 113B to the value indicated by the read target SEQ#(S2306). That is, the second DKC 111B adds 1 to the value indicated by the read SEQ#1008B.

JNL Reflection Processing

With reference to the JNL reflection in the second storage 105B as an example, the JNL reflection processing is described.

Figure 24:
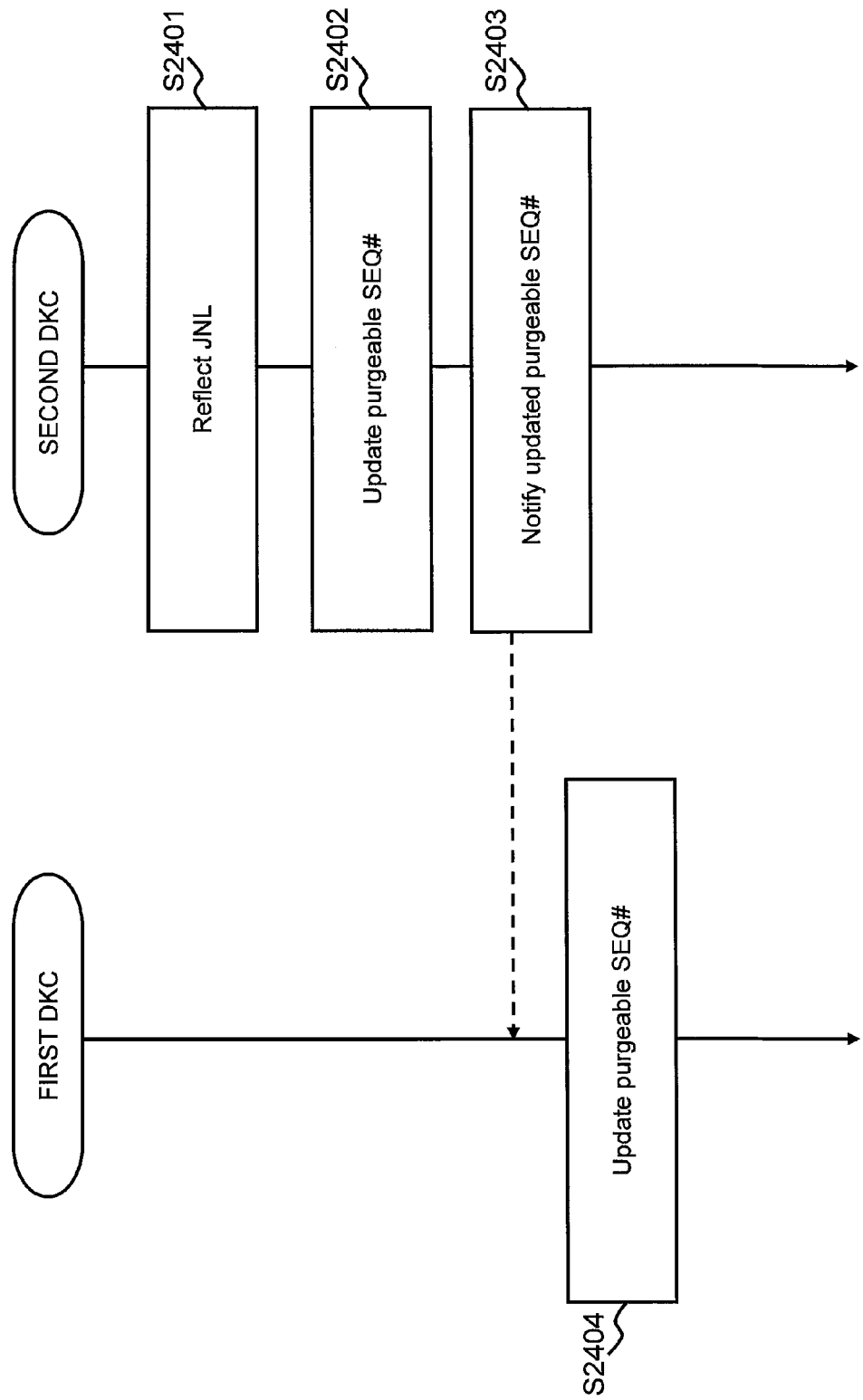
FIG. 24 shows the flow of the reflection processing of the JNL.

As shown in FIG. 24, the second DKC 111B reflects the JNL comprising the oldest SEQ# of one or more JNLs which are not reflected in the second JVOL 115B in the SVOL 113B (S2401). As more specifically described, the second DKC 111B reads the JNL including the SEQ# which is larger by 1 than the value indicated by the purgeable SEQ#1007B corresponding to the mirror #0 in the JNL group 112B (the information 1007B which the JNL group management table 704B comprises) from the second JVOL 115B, and writes the data which the read JNL comprises to the SVOL 113B.

The second DKC 111B changes the value indicated by the purgeable SEQ#1007B corresponding to the mirror #0 in the JNL group 112B (S2402). As more specifically described, the second DKC 111B adds 1 to the value indicated by the purgeable SEQ#1007B.

The second DKC 111B notifies the value indicated by the purgeable SEQ#1007B which is updated to the first DKC 111A (S2403).

The first DKC 111A changes the value indicated by the purgeable SEQ#1007A corresponding to the mirror #0 in the JNL group 112A to the value notified from the second DKC 111B (S2404).

JVOL Usage Rate Check

Each DKC checks the JVOLs in the storage comprising the DKC regularly (or irregularly). Hereinafter, that operation is described with reference to the first storage 105A as an example.

Figure 25:
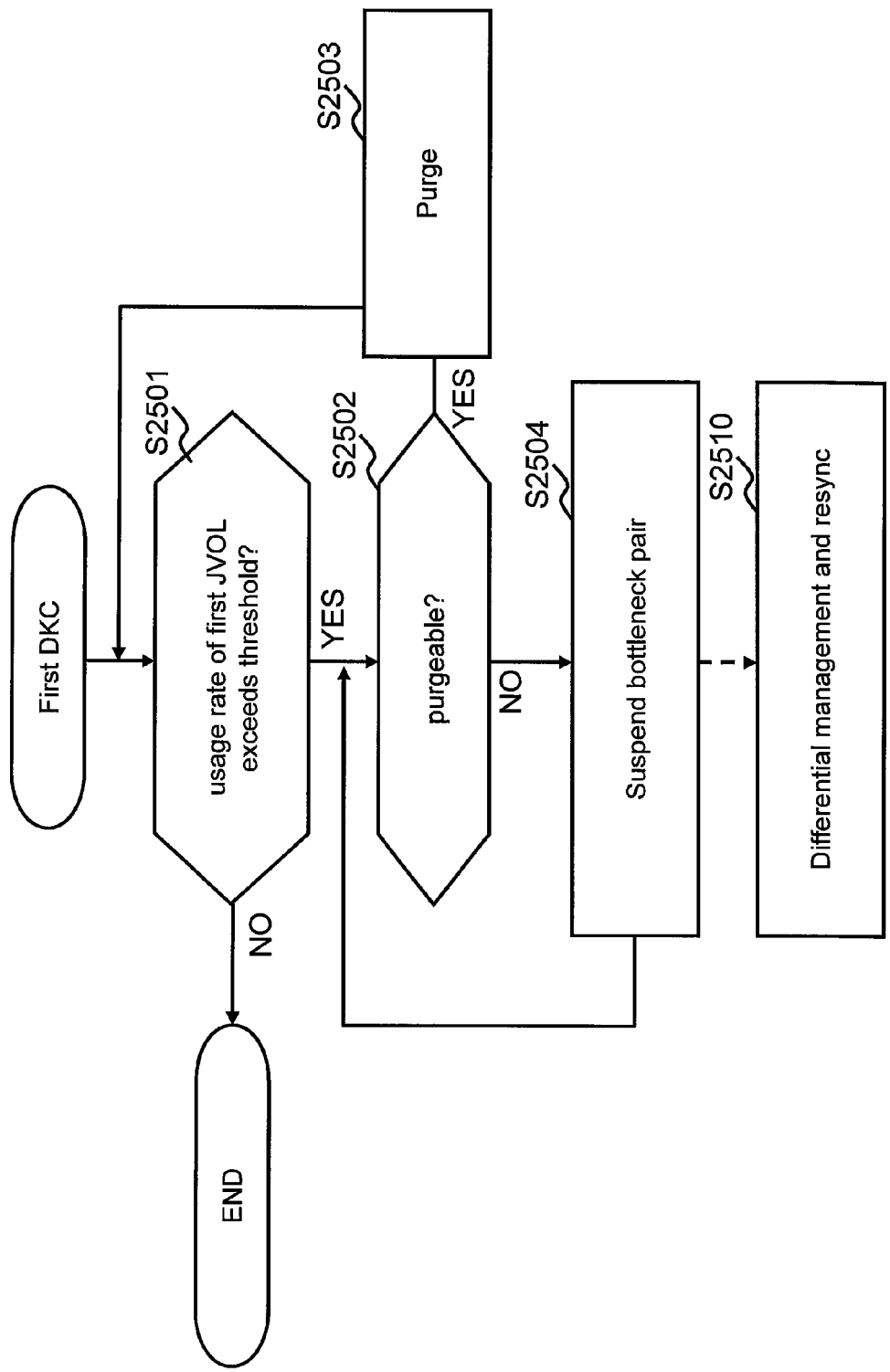
FIG. 25 shows the flow of the processing related to the usage rate check of the first JVOL 115A.

The first DKC 111A performs the processing shown in FIG. 25 regularly (or irregularly).

That is, the first DKC 111A determines whether the usage rate of the first JVOL 115A (the rate of the total capacity of one or more JNLs in the first JVOL 115A to the capacity of the first JVOL 115A) exceeds a specified threshold or not (S2501). If the result of the determination is negative (S2501: NO), the processing is completed.

If the result of the determination is positive (S2501: YES), the first DKC 111A determines whether any purgeable JNLs exist in the first JVOL 115A or not (S2502). The purgeable JNLs are from the JNL (A) to the JNL (B) below.

(A) The JNL including the value indicated by the purged SEQ#1006A (refer to FIG. 19) corresponding to the JNL group 112A as an SEQ#.
(B) The JNL including the smaller value as an SEQ# of the value indicated by the purgeable SEQ#1007A corresponding to the mirror #0 of the JNL group 112A and the value indicated by the purgeable SEQ#1007A corresponding to the mirror #1 of the JNL group 112A.

If the result of the determination at S2502 is positive (S2502: YES), the first DKC 111A purges the purgeable JNLs from the first JVOL 115A (S2503). After that, the first DKC 111A performs S2501.

If the result of the determination at S2502 is negative (S2502: NO), the first DKC 111A suspends the bottleneck pair (S2504). The "bottleneck pair" is the pair which corresponds to either the mirror #0 or the mirror #1 and whose value indicated by the purgeable SEQ#1007A is the smaller. The reason the pair is the bottleneck is that, as the smaller purgeable SEQ#10007A is significantly smaller than the larger purgeable SEQ#10007A, the number of purgeable JNLs became small.

If the bottleneck pair is suspended, the number of purgeable JNLs increases. As more specifically described, the purgeable JNLs end at the JNL including the value indicated by the larger purgeable SEQ#1007A as an SEQ#. Therefore, the first DKC 111A performs S2502 and S2503 after S2504.

Furthermore, the first DKC 111A is, if suspending the bottleneck pair, supposed to perform differential management and resync for the pair (S2510). As more specifically described, the processing below is supposed to be performed (this description assumes the bottleneck pair to be the pair corresponding to the mirror #1).

The first DKC 111A, if the data is written to the PVOL 113A and if the bit corresponding to the write destination block of the data (the bit in the differential bitmap 706A corresponding to the PVOL 113A) is off, turns the bit to on.

The first DKC 111A, by a specified timing (e.g. when receiving a resync instruction from the first host 103A (or the management terminal)), performs resync. As more specifically described, the first DKC 111A writes the JNL including the data in the block corresponding to the bit which is on to the third JVOL 115C.

Note that, even after suspending the bottleneck pair from among the pairs corresponding to the mirror #0 and the mirror #1 and performing S2502 and S2503, if the result of the determination at S2501 is positive, the result of the determination at S2502 becomes negative. In this case, the first DKC 111A suspends the remaining pairs. As a result of this, in FIG. 21, both S2101-1 and S2101-2 are considered to have been performed. In this case, all the JNLs for the JNL group 112A are purgeable JNLs, if those JNLs are purged at S2503, the result of the determination at S2501 inevitably becomes negative, and the processing is completed.

Processing Performed if a Failure Occurs in First Storage 105A

Figure 26:
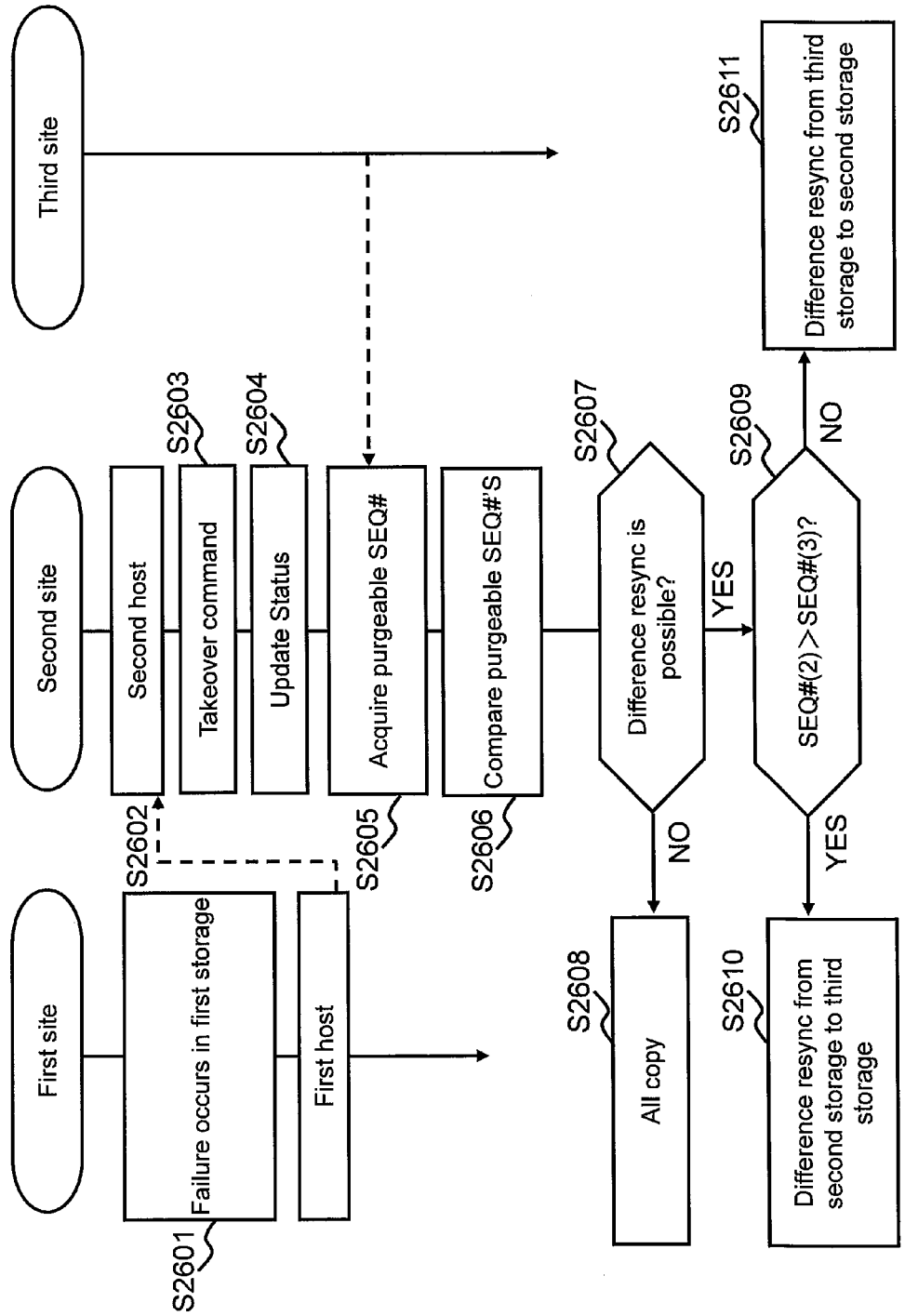
FIG. 26 shows the flow of the processing performed if a failure occurs in the first storage 105A.

As shown in FIG. 26, if a failure occurs in the first storage 105A (S2601), a failover is performed from the first host 103A to the second host 103B (S2602).

Next, the second host 103B transmits a takeover command as a specified command to the second storage 105B (S2603).

Next, the second DKC 111B, in response to the takeover command, updates the various statuses (S2604). As more specifically described, for example, the second DKC 111B performs the updates described below.

Updating the pair status corresponding to the DVOL 113B and the mirror #0 to "SSWS." The second DKC 111B, if the DVOL 113B is the SVOL, normally inhibits data write from the second host 103B to the DVOL 113B, but the "SSWS" indicates that, even if the DVOL 113B is the SVOL, data write is permitted.

Updating the pair status corresponding to the DVOL 113B and the mirror #1 to "SSUS." "SSUS" indicates that the pair corresponding to the mirror #1 is suspended. By this method, even if the pair status corresponding to the mirror #0 is "SSWS," write inhibition from the second host 103B to the DVOL 113B is maintained.

Changing the status of the DVOL 113B to "HOLD." "HOLD" indicates that the start of difference resync is being waited for.

Turning the bit corresponding to the mirror #0 in the mirror bitmap 707B to off, and turning the bit corresponding to the mirror #2 to on.

Next, the second DKC 1113 acquires the value indicated by the purgeable SEQ# from the third storage 105C (S2605). As more specifically described, for example, the second DKC 111B requires the value which the purgeable SEQ#1007C corresponding to the JNL group 112C and the mirror #2 (the information 1007C in the JNL group management table 704C) indicates to the third storage 105C via the control paths between the second and the third storages 105B and 105C. The third DKC 111C, in response to the request, notifies the value indicated by the purgeable SEQ#1007C corresponding to the JNL group 112C and the mirror #2 to the second DKC 111B via the above-mentioned control path.

Next, the second DKC 111B compares the value indicated by the purgeable SEQ#1007B corresponding to the JNL group 112B and the mirror #2 with the value indicated by the acquired purgeable SEQ#1007C (S2606). That is, the second DKC 111B compares the SEQ#(hereinafter referred to as the SEQ#(2)) which the latest JNL reflected in the second storage 105B comprises with the SEQ#(hereinafter referred to as the SEQ#(3)) which the latest JNL reflected in the third storage 105C comprises.

Next, the second DKC 111B determines whether difference resync is possible or not (S2607).

At this point, the cases where difference resync is possible and the cases where difference resync is not possible are described. In that case, the description refers to the larger SEQ# of the SEQ#(2) and the SEQ#(3) as the "SEQ# (Large)" and the smaller SEQ# as the "SEQ#(Small)." Furthermore, of the second and the third storages 105B and 105C, the storage comprising the SEQ#(Large) is referred to as the storage (Large) and the other storage is referred to as the storage (Small).

Figure 27:
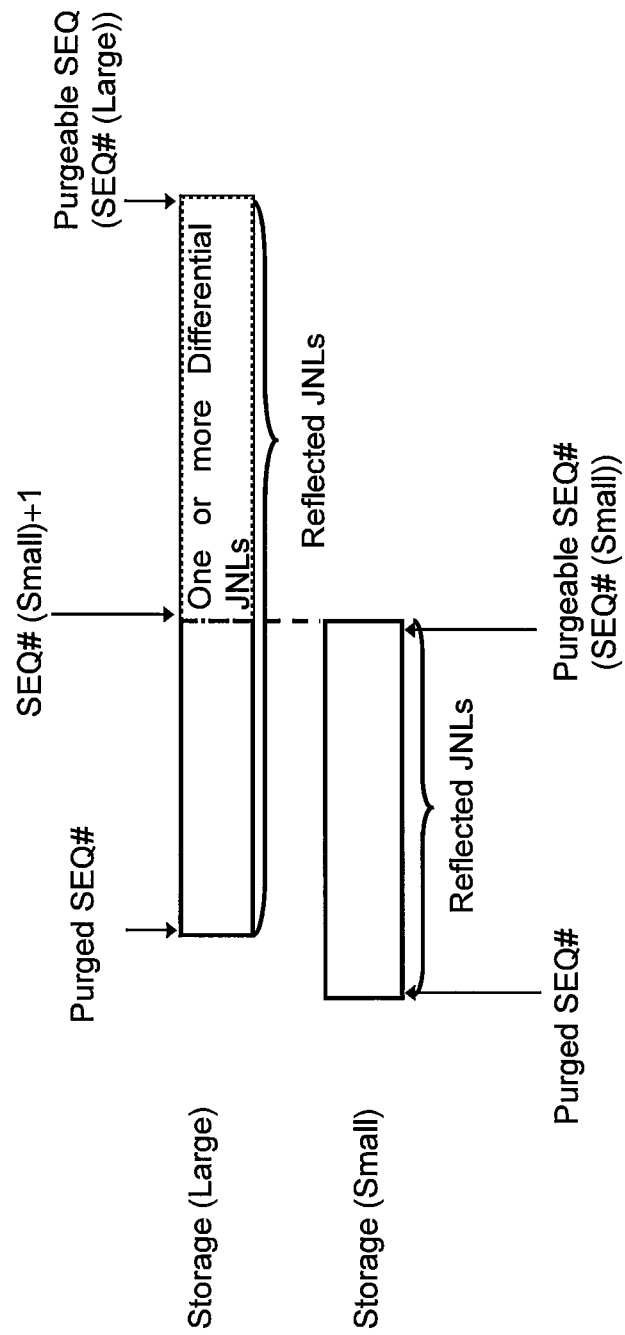
FIG. 27 shows an example of the cases where difference resync is possible.

The cases where difference resync is possible are the cases shown in FIG. 27, that is, the cases where the value indicated by the purged SEQ#corresponding to the JNL group and the mirror #2 of the storage (Large) is equal to or smaller than the SEQ#(Small). In another expression, these are the cases where the storage (Large) comprises the JNLs from the JNL including the SEQ#next to the SEQ#(Small) (SEQ#equal to SEQ#(Small)+1) (hereinafter referred to as the JNL (X)) to the JNL including the SEQ#(Large) (hereinafter referred to as the JNL (Y)). Hereinafter, the one or more JNLs from the JNL (X) to the JNL (Y) (that is, one or more JNLs including the SEQ#'s from the SEQ#equal to SEQ#(Small)+1 to the SEQ#(Large)) are referred to as the "one or more differential JNLs."

Figure 28:
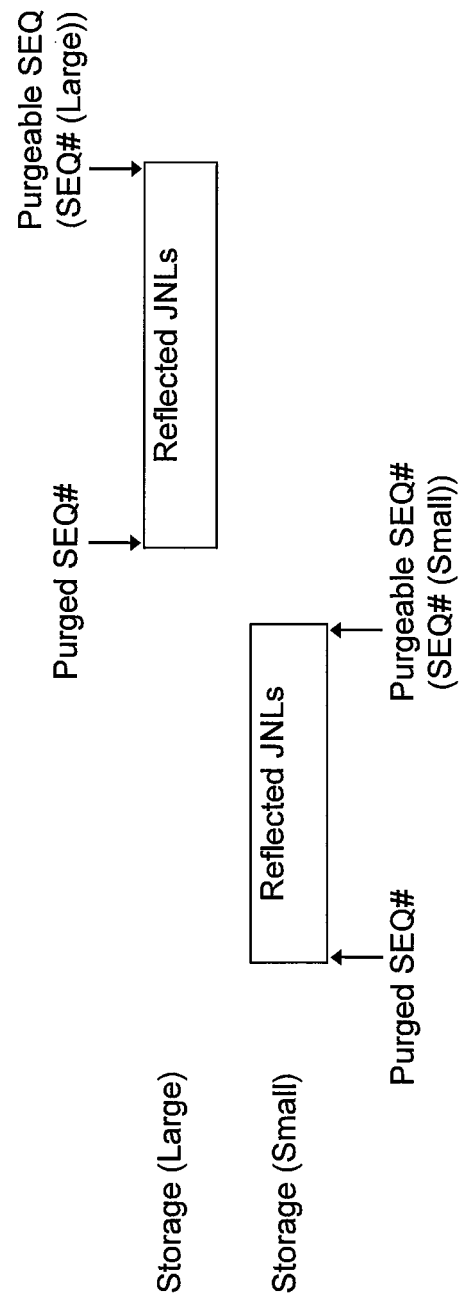
FIG. 28 shows an example of the cases where difference resync is not possible.

Meanwhile, the cases where difference resync is not possible are the cases shown in FIG. 28, that is, the cases where the value indicated by the purged SEQ#corresponding to the JNL group and the mirror #2 of the storage (Large) is the value larger than the SEQ#next to the SEQ#(Small) (SEQ#equal to SEQ#(Small)+1). This is because the SEQ#'s are not sequential.

FIG. 26 is referred to again.

If the result of the determination at S2607 is negative (S2607: NO), the second DKC 111B performs the all copy (S2608). That is, the second DKC 111B copies all the data stored in the DVOL (e.g. the DVOL 113B) in the storage comprising the larger SEQ# of the SEQ#(2) and the SEQ# (3) to the DVOL (e.g. the DVOL 113C) in the storage comprising the smaller SEQ# of the SEQ#(2) and the SEQ#(3). By this method, the contents of the DVOL 113B and the contents of the DVOL 113C match each other.

If the result of the determination at S2607 is positive (S2607: YES), if the SEQ#(2) is larger than the SEQ#(3) (S2609: YES), difference resync from the second storage 105B to the third storage 105C is performed (S2610). That is, the difference resync shown in FIG. 9 is performed. As more specifically described, the second DKC 111B, by reading one or more differential JNLs from the second JVOL 115B and transmitting a write request of one or more differential JNLs (write request specifying the third JVOL 115C) to the third storage 105C, writes those one or more differential JNLs to the third JVOL 115C (instead of that, the third DKC 111C may also transmit a read request specifying the second JVOL 115B (read request including the SEQ#'s from the SEQ#next to the SEQ#(3) to the SEQ#(2)), receive one or more differential JNLs from the second storage 105B in response to the same, and write the one or more differential JNLs to the third JVOL 115C). The third DKC 111C reflects the one or more differential JNLs in the third JVOL 115C in the DVOL 113C, starting with the JNL comprising the SEQ#next to the SEQ#(3), in ascending order of the SEQ#'s. By this method, the contents of the DVOL 113C match the contents of the DVOL 113B.

If the result of the determination at S2607 is positive (S2607: YES), if the SEQ#(2) is smaller than the SEQ#(3) (S2609: NO), difference resync from the third storage 105B to the second storage 105C is performed (S2611). That is, the difference resync shown in FIG. 8 is performed. As more specifically described, the second DKC 111B transmits a read request specifying the third JVOL 115C (read request including the SEQ#'s from the SEQ#next to the SEQ#(2) to the SEQ#(3)), receives one or more differential JNLs from the third storage 105C in response to the same, and write those one or more differential JNLs to the second JVOL 115B (instead of that, the third DKC 111B, by reading one or more differential JNLs from the third JVOL 115C and transmitting a write request of one or more differential JNLs (write request specifying the second JVOL 115B) to the second storage 105B, may also write the one or more differential JNLs to the second JVOL 115B). The second DKC 111B reflects the one or more differential JNLs in the second JVOL 115B in the DVOL 113B, starting with the JNL comprising the SEQ#next to the SEQ#(2), in ascending order of the SEQ#'s. By this method, the contents of the DVOL 113B match the contents of the DVOL 113C.

Figure 29:
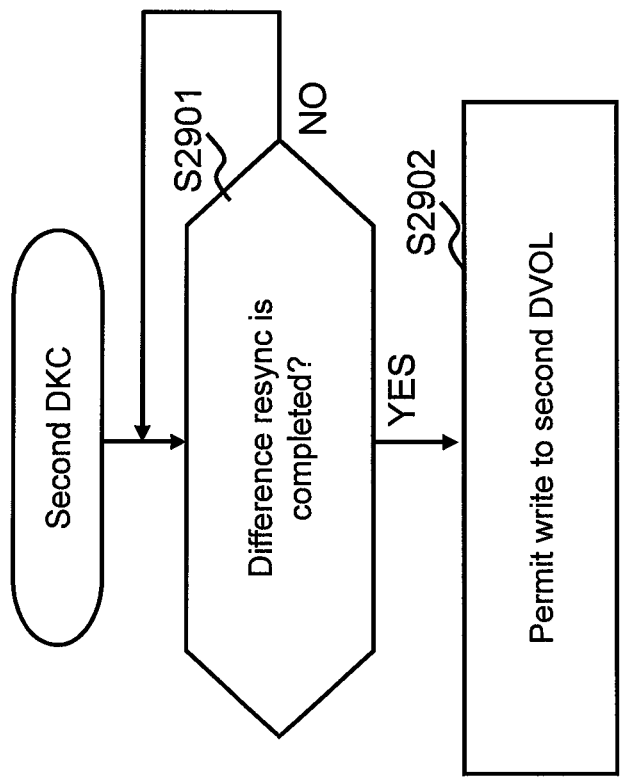
FIG. 29 shows the timing at which data write from the second host 103B to the second DVOL 113B is permitted.

As shown in FIG. 29, the second DKC 111B, if the difference resync at S2610 or S2611 is completed (S2901: YES), permits data write from the second host 103B to the second DVOL 113B (S2902). As more specifically described, the second DKC 111B updates the pair status corresponding to the DVOL 113B and the mirror #2 to "SSWS" (i.e. write permission). By this method, as well as the pair status corresponding to the DVOL 113B and the mirror #0, the pair status corresponding to the mirror #2 is also changed to "SSWS," and therefore data write from the second host 103B to the second DVOL 113B becomes possible. Note that, if the difference resync at S2610 or S2611 is completed, the second DKC 11B makes the second DVOL 113B the PVOL (the third DVOL 113C is the SVOL).

After this, the operation is continued in the second site 101B. In the second site 101B, the initial value of the SEQ#corresponding to the JNL group 112B is the SEQ#next to larger SEQ# of the SEQ#(2) and the SEQ#(3) (that is, the value where 1 is added to the larger SEQ# of the SEQ#(2) and the SEQ#(3)).

The second host 103B, in accordance with the operation, transmits a write request specifying the PVOL 113B, to the second storage 105B. The second DKC 111B writes the data complying with the write request to the CM 630B, and then writes the same to the PVOL 113B. The second DKC 111B updates the SEQ#, creates a JNL including the updated SEQ#(or the SEQ#before the update) and the data written to the PVOL 113B, and writes the JNL to the second JVOL 115B. The third DKC 111C, by transmitting a read request specifying the second JVOL 115B to the second storage 105B, receives a JNL in the second JVOL 115B from the second storage 105B. The third DKC 111C writes the received JNL to the third JVOL 115C. The third DKC 111C reflects the JNLs in the third JVOL 115C that are not reflected in the SVOL 113C in ascending order of the SEQ#'s. By this series of processing, the data written to the PVOL 113B is copied to the SVOL 113C.

As described above, according to the Embodiment 1, in the site 101B as the switch destination of the operation site, the second storage 105B acquires the SEQ#(SEQ#(3)) which the latest JNL reflected in the third storage 105C comprises, and compares the SEQ#(3) with the SEQ#(SEQ# (2)) which the latest JNL reflected in the second storage 105B comprises. Furthermore, the second storage 105B, with reference to the relationship between the purged SEQ# in the storage comprising the larger SEQ# of the SEQ#(2) and the SEQ#(3) and the smaller SEQ# of the SEQ#(2) and the SEQ#(3), determines whether difference resync is possible or not. Then, the difference resync based on the result of the determination and the relationship between the SEQ#'s (2) and (3) is performed. By this method, even if the first storage 105A is suspended due to reasons such as a failure, the operation is appropriately continued.

Furthermore, according to the Embodiment 1, the JVOLs included in one copy source JNL group are common to multiple copy destination JNL groups. In another expression, the number of JVOLs included in one copy source JNL group does not depend on the number of copy destination JNL groups. By this method, the storage capacity consumed in the first storage 105A can be saved.

Embodiment 2

Hereinafter, the Embodiment 2 of this invention is described. At this point, the difference from the Embodiment 1 is mainly described, and the description of what is common to the Embodiment 1 is omitted or simplified (this also applies to the Embodiments 3 and 4 described later).

Figure 30:
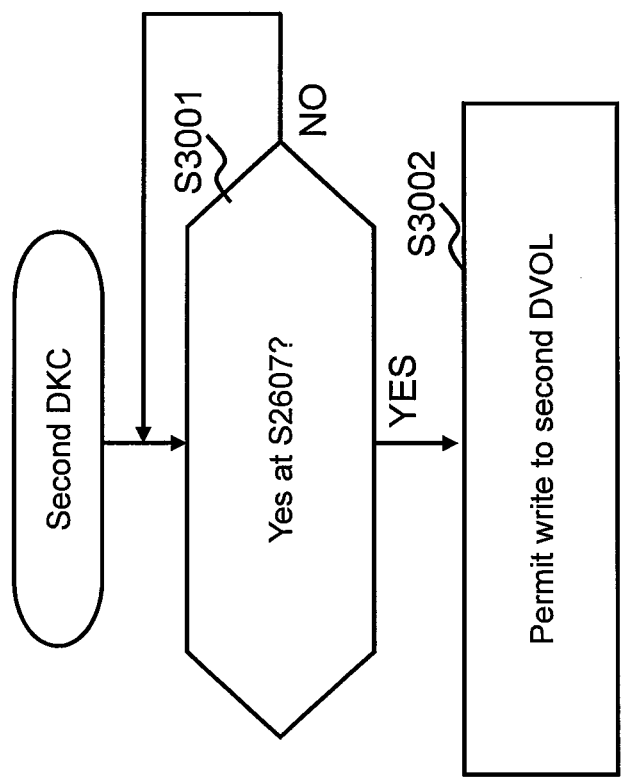
FIG. 30 shows the timing at which data write from the second host 103B to the second DVOL 113B is permitted in the Embodiment 2 of this invention.

In the Embodiment 2, even in process of difference resync, data write to the second DVOL 113B is permitted. As more specifically described, as shown in FIG. 30, if the second DKC 111B is proved to be YES at S2607 in FIG. 26 (S3001: YES), data write from the second host 103B to the second DVOL 113B is permitted (S3002). As more specifically described, the second DKC 111B changes both the pair status corresponding to the second DVOL 113B and the mirror #0 and the pair status corresponding to the second DVOL 113B and the mirror #2 to "SSWS." Note that "if the second DKC 111B is proved to be YES at S2607" indicates the case where difference resync either at S2610 or at S2611 is determined to be performed.

However, in this case, if no ingenuity is undertaken, the problem described below could occur. That is, it is possible that, in the difference resync from the third storage 105C to the second storage 105B, the data in the differential JNLs (older data) might be written to the block (the block in the DVOL 113B) comprising the data written from the second host 103B (newest data).

Figure 31:
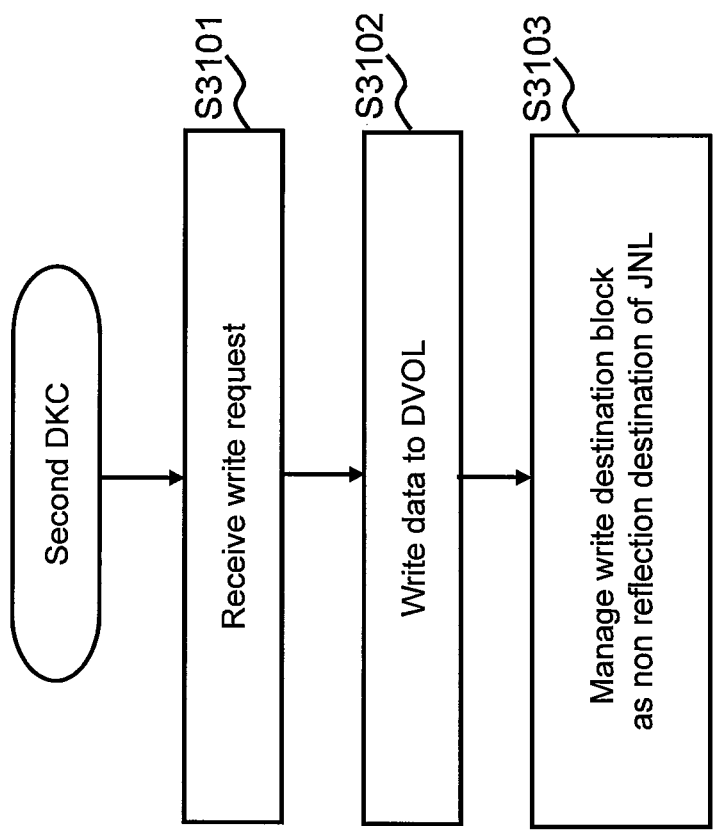
FIG. 31 shows the flow of the write processing in the second storage 105B in cases where difference resync from the third storage 105C to the second storage 105B is performed in the Embodiment 2 of this invention.

In the Embodiment 2, for avoiding the problem, if the difference resync from the third storage 105C to the second storage 105B is determined to be performed, the processing shown in FIG. 31 is performed.

That is, the second DKC 111B, if receiving a write request specifying the DVOL 113B from the second host 103B (S3101), writes the write target data to the write destination block in the DVOL 113B (S3102). At that point, the second DKC 111B manages the write destination block as the non reflection destination of the JNL (S3103). As more specifically described, for example, the non reflection management information indicating the write destination in which no JNL needs to be reflected is stored in the SM 640B, and the second DKC 111B registers the number of the DVOL 113B and the block address of the DVOL 113B (e.g. the LBA (Logical Block Address)) to the non reflection management information in the SM 640B.

Figure 32:
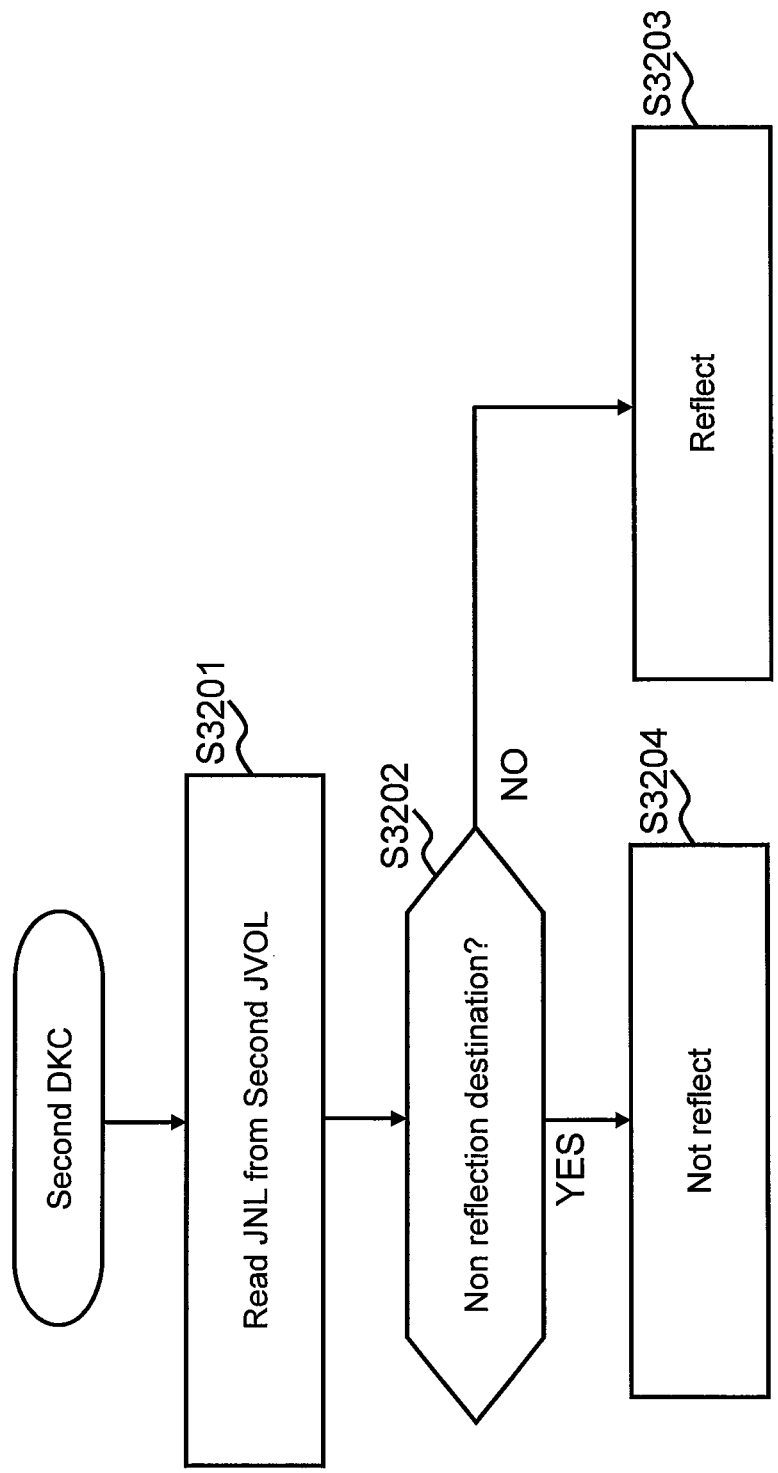
FIG. 32 shows the flow of the JNL reflection processing in the second storage 105B in cases where difference resync from the third storage 105C to the second storage 105B is performed in the Embodiment 2 of this invention.

As shown in FIG. 32, the second DKC 111B, if reading JNL from the second JVOL 115B, unless the reflection destination block of the JNL (the block in the DVOL 113B) is a non reflection destination (S3202: NO), reflects the JNL (S3203) or, if the reflection destination block of the JNL is a non reflection destination (S3202: YES), does not reflect the JNL (S3204).

At S3202, "whether the reflection destination block of the JNL is a non reflection destination or not" indicates, for example, whether the address of the reflection destination block is registered to the above-mentioned non reflection management information or not.

At S3204, "not reflect the JNL" indicates, for example, ignoring the JNL. The ignored JNL may be left in the second JVOL 115B or may also be immediately deleted from the second JVOL 115B.

According to the Embodiment 2, the operation can be started earlier than the Embodiment 1 and, at the same time, the problem which could occur because the DVOL 113B is in the write enable status in process of difference resync (that the older data in the differential JNLs is written to the block to which the newest data is written) can also be avoided.

Embodiment 3

In the Embodiment 3, even in process of difference resync, the second host 103B is permitted to read data from the second DVOL 113B (that type of read is inhibited in the Embodiment 1). As more specifically described, for example, the second DKC 111B is, if S2607 in FIG. 26 is proved to be YES, assumed to have permitted the data read from the second DVOL 113B.

However, in this case, if no ingenuity is undertaken, the problem described below could occur. That is, it is possible that, in process of the difference resync from the third storage 105C to the second storage 105B, the data which the second host 103B reads from the DVOL 113B might be the older data instead of the newest data (the data which the differential JNL whose SEQ# is the largest comprises).

Figure 33:
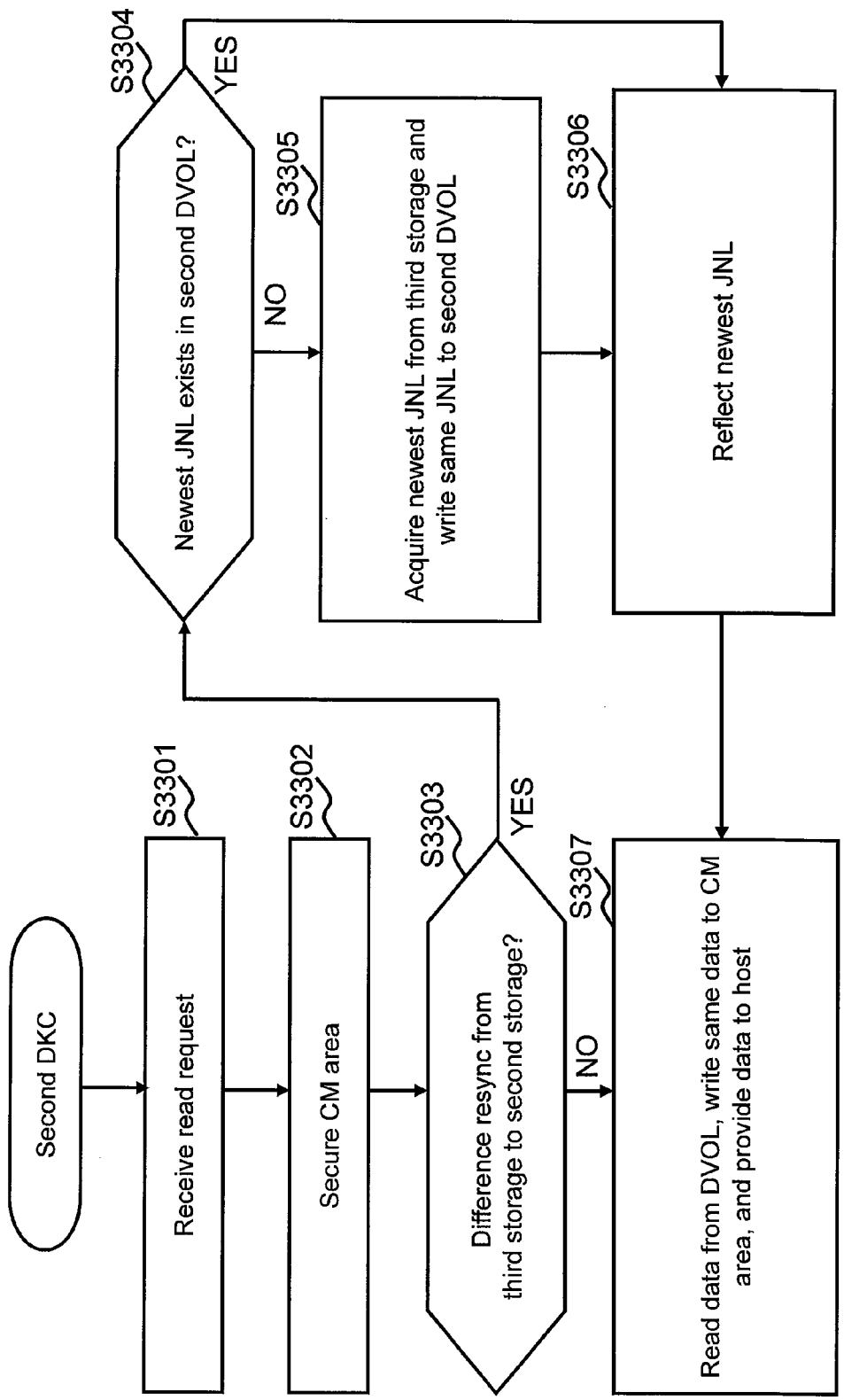
FIG. 33 shows the flow of the read processing in the second storage 105B in cases where difference resync from the third storage 105C to the second storage 105B is performed in the Embodiment 3 of this invention.
Figure 34:
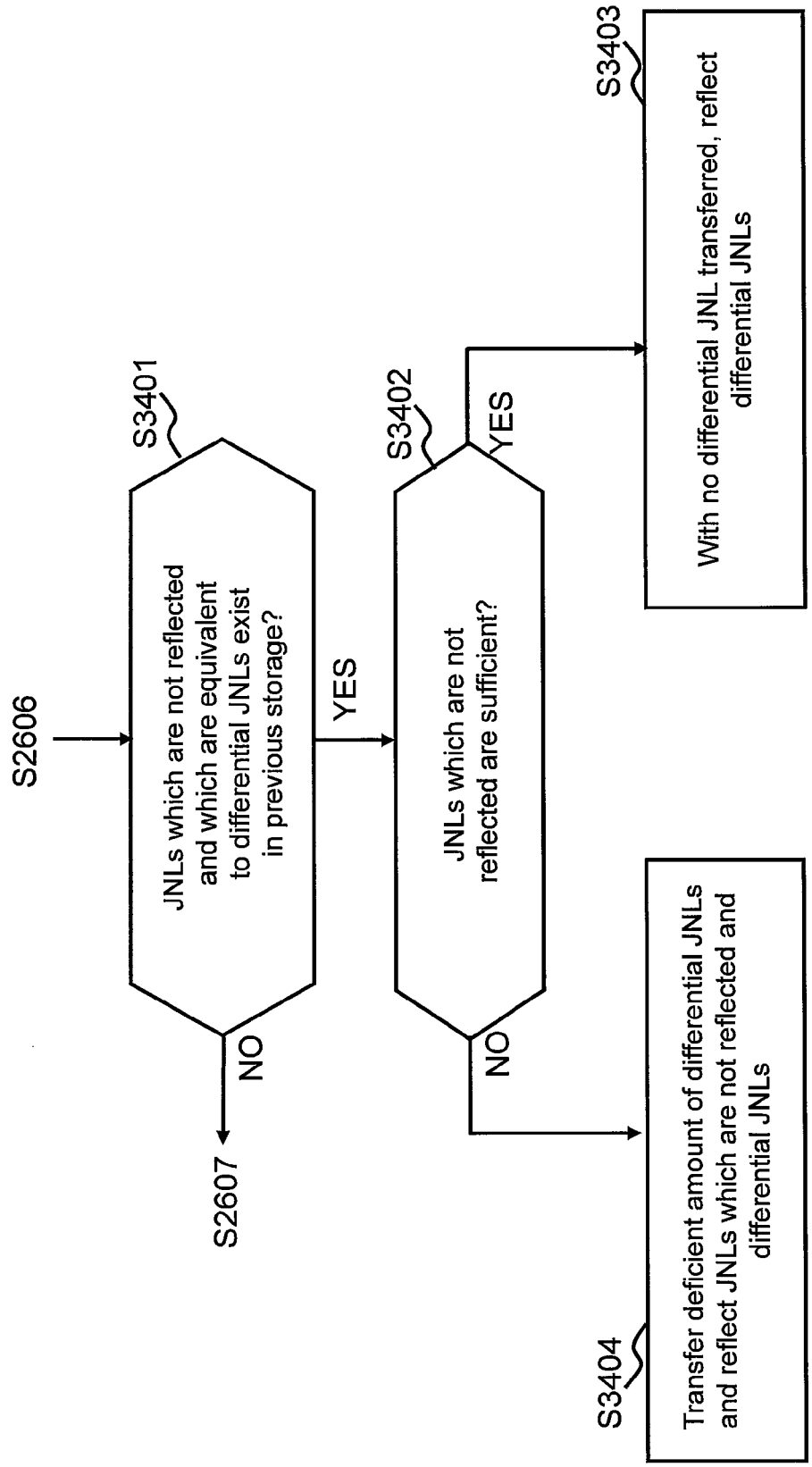
FIG. 34 shows the flow of the processing related to the determination whether the transfer of differential JNLs is required or not in the Embodiment 4 of this invention.

In the Embodiment 3, for avoiding the problem, if the difference resync from the third storage 105C to the second storage 105B is determined to be performed, the processing shown in FIG. 33 is performed.

That is, the second DKC 111B, if receiving a read request specifying the DVOL 113B before the difference resync is completed (S3301), secures the CM area in the CM 630B (S3302), and determines whether the difference resync is the difference resync from the third storage 105C to the second storage 105B or not (S3303).

If the result of the determination is negative (S3303: NO), the second DKC 111B reads data from the read source block specified by the read request (the block in the DVOL 113B), writes the read data to the CM area, and transmits the data in the CM area to the second host 103B (S3307).

If the result of the determination at S3303 is positive (S3303: YES), the second DKC 111B determines whether the newest JNL whose read source block is the reflection destination exists in the second JVOL 115B or not (S3304). The "newest JNL" referred to at this point is the JNL which is, among the one or more differential JNLs which the second and the third JVOLs 115B and 115C comprise, any of the one or more JNLs whose read source blocks are the reflection destinations, and which comprises the largest SEQ# of one or more SEQ#'s which those one or more JNLs comprise. Therefore, for this determination, the second DKC 111B ascertains the SEQ# which the differential JNL in the third DVOL 115B comprises.

If the result of this determination is positive (S3304: YES), the second DKC 111B reflects the newest JNL from the second JVOL 115B in the read source block in the DVOL 113B (S3306), and then performs S3307. Note that the second DKC 111B, in the difference resync, even if the differential JNL whose reflection destination is the above-mentioned read source block and which is older than the above-mentioned newest JNL (the JNL comprising the smaller SEQ# than the SEQ# which the newest JNL comprises) is acquired, does not reflect the differential JNL in the read source block (e.g. purges the JNL from the second JVOL 111B). Furthermore, at S3307 in the cases where S3304 is YES, the data transmitted to the second host 103B, instead of being provided from the second DVOL 113B, may also be provided from the JNL.

If the result of the determination at S3304 is negative (S3304: NO), the second DKC 111B, by transmitting the read request including the SEQ# of the newest JNL to the third storage 105C, receives the newest JNL from the third storage 105C, and writes the newest JNL to the second JVOL 115B. That is, the second DKC 111B acquires the newest JNL prior to the other JNLs from the third storage 105C. After that, the second DKC 111B performs the above-mentioned S3306 and S3307. Note that, even at S3307 in the cases where S3304 is NO, the data transmitted to the second host 103B, instead of being provided from the second DVOL 113B, may also be provided from the JNL.

According to the Embodiment 3, the operation can be started earlier than the Embodiment 1 and, at the same time, the problem which could occur because the DVOL 113B is in the read enable status in process of difference resync (that the older, instead of the newest data, is provided to the second host 103C) can also be avoided.

Embodiment 4

In the Embodiment 4, even if all the differential JNLs are not transferred between the storages 105B and 105C, difference resync can be performed.

For example, after S2606 in FIG. 26, the second DKC 111B determines whether the JNLs which are not reflected and are equivalent to the differential JNLs exist in the previous storage or not (S3401).

At this point, the "previous storage" indicates the storage apparatus which is either the storage 105B or the 105C and which comprises the smaller SEQ# of the SEQ#(2) and the SEQ#(3) as the purgeable SEQ#. What is not the previous storage among the storages 105B and the 105C is hereinafter referred to as the "new storage."

Figure 35:
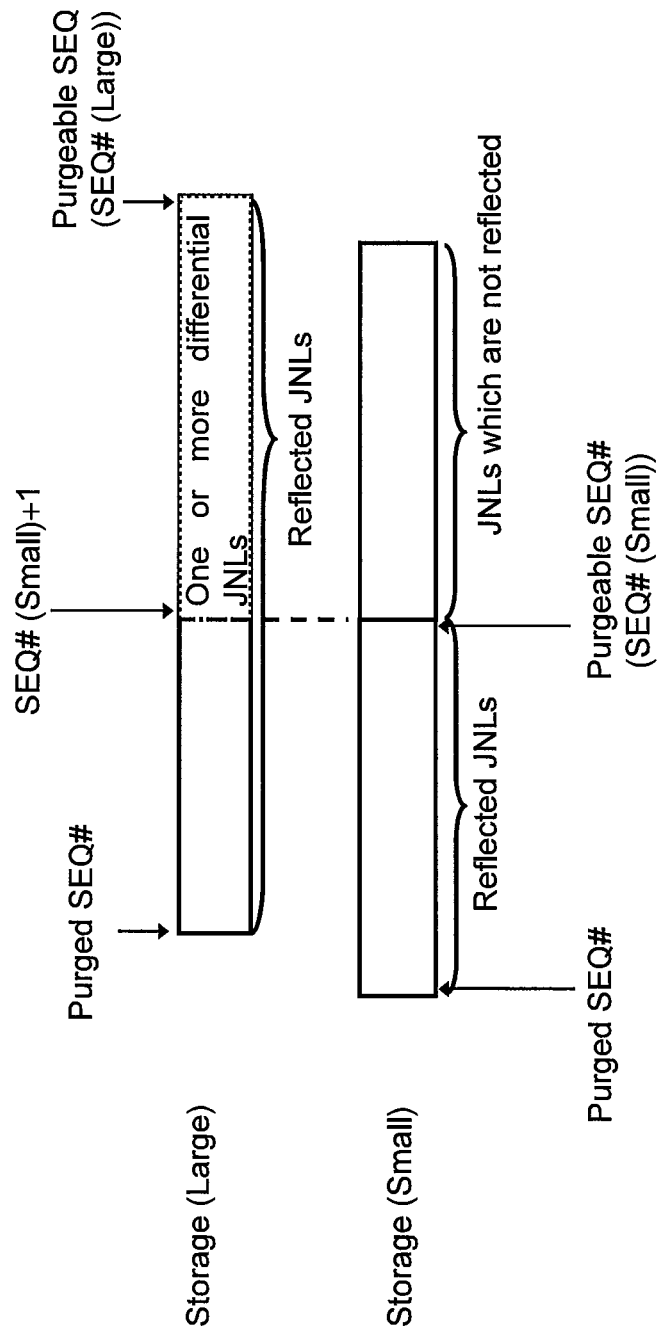
FIG. 35 shows an example of the cases where differential JNLs of which the transfer is not required exist.

Furthermore, that "the JNLs which are not reflected and are equivalent to the differential JNLs exist in the previous storage" indicates, as shown in FIG. 35, that the JNLs which are not reflected and comprise the larger SEQ#'s than the purgeable SEQ# in the previous storage exist in the JVOLs in the previous storage.

If the previous storage is the second storage 105B, for example, if at least one JNL which is not reflected exists in the second JVOL 115B, the result of the determination at S3401 becomes positive.

Meanwhile, if the previous storage is the third storage 105C, for example, the second DKC 111B can make the determination of S3401 by inquiring to the third DKC 111C about the value indicated by the SEQ# which the newest JNL in the one or more JNLs which are not reflected comprises. As more specifically described, the second DKC 111B can make the determination of S3401 by comparing the SEQ# answered by the third DKC 111C (hereinafter referred to as the answered SEQ#) with the SEQ#(3)+1. If the answered SEQ# is equal to or larger than the SEQ#(3)+1, the result of the determination at S3401 becomes positive.

If the result of the determination at S3401 is negative (S3401: NO), S2607 in FIG. 26 is performed.

If the result of the determination at S3401 is positive (S3401: NO), the second DKC 111B determines whether the JNLs which are not reflected in the previous storage are sufficient or not (S3402). If the SEQ# which the newest JNL which is not reflected in the previous storage comprises is equal to or larger than the SEQ# which the newest JNL of the one or more differential JNLs, the result of this determination becomes positive.

If the result of this determination is positive (S3402: YES), the DKC in the previous storage reflects all the JNLs equivalent to the one or more differential JNLs among the one or more JNLs which are not reflected in the previous storage in the DVOL in the previous storage (S3403). If there are surplus JNLs which are not reflected, the DKC in the previous storage may also purge the surplus JNLs.

If the result of the determination at S3402 is negative (S3402: NO), S3404 is performed. That is, the DKC in the previous storage acquires the deficient amount of differential JNLs (the JNLs equivalent to the difference between the JNLs which are not reflected and the one or more differential JNLs in the previous storage) from the new storage, and stores the differential JNLs in the JVOL in the previous storage. Then, the DKC in the previous storage reflects the all JNLs which are not reflected and the differential JNLs in the JVOL in the previous storage in the DVOL in the previous storage.

Though some embodiments of this invention are described above, this invention is not limited to those embodiments and, as a matter of course, also comprises any changes or modifications within the spirit and scope hereof.

For example, two or more of the Embodiments 1 to 4 may also be combined.

Meanwhile, for example, though the above-mentioned description adopts the sequential numbers (SEQ#'s) as the update numbers, other types of numbers which increase or decrease regularly may also be adopted.

Meanwhile, for example, in the Embodiments 1 to 4, if the first storage 105A is suspended, the second storage 105B in the site as the switched operation site performs the various types of processing (e.g. the determination whether delta resync is possible or not) while, in at least one of the Embodiments 1 to 4, at least one of the various types of processing may also be performed by the third storage 105C.

Meanwhile, for example, though all the JNLs comprise the updated SEQ#'s, the SEQ#'s before the updates may also be comprised instead of the same.

Meanwhile, for example, in at least one of the storages 105A to 105C, there may also be multiple JNL groups.

Meanwhile, for example, at least one of the storages 105A to 105C may also comprise logical volumes other than the logical volumes included in the JNL group.

Meanwhile, for example, JNL transfer between storage apparatuses may be either the transfer performed by the copy destination storage apparatus reading JNLs from the JVOL in the copy source storage apparatus or the transfer performed by the copy source storage apparatus writing the JNLs to the JVOL in the copy destination storage apparatus.

REFERENCE SIGN LIST

101A: first storage apparatus, 101B: second storage apparatus, 101C: third storage apparatus

The invention claimed is:

1. A storage system comprising:
    a first storage apparatus having a first controller with at least one processor, and a plurality of first storage devices configuring a first volume storing data sent from a first host computer and a first journal volume storing journals, wherein each of the journals includes a sequential number and the data written to the first volume;
    a second storage apparatus having a second controller with at least one processor, and a plurality of second storage devices configuring a second journal volume storing journals sent from the first storage apparatus asynchronously and a second volume to which each of the journals stored in the second journal volume is reflected in order of the sequential number in each of the journals; and
    a third storage apparatus having a third controller with at least one processor, and a plurality of third storage devices configuring a third journal volume storing journals sent from the first storage apparatus asynchronously and a third volume to which each of the journals stored in the third journal volume is reflected in order of the sequential number in each of the journals,
    wherein if a failure occurs in the first storage apparatus,
        if a second sequential number in the latest reflected journal to the second volume is newer than a third sequential number in the latest reflected journal to the third volume, the second controller in the second storage apparatus sends a differential journal to the third storage apparatus,
        if the second sequential number in the latest reflected journal to the second volume is older than the third sequential number in the latest reflected journal to the third volume, the second controller in the second storage apparatus receives a differential journal from the third storage apparatus, and
        the second controller in the second storage apparatus changes a copy pair status between the second volume and the third volume, and starts to receive data to the second volume from a second host computer.

2. The storage system according to claim 1,
    wherein after the second controller in the second storage apparatus starts to receive data to the second volume from the second host computer, the second controller stores a next journal to the second journal volume, wherein the next journal includes a sequential number next to the second sequential number or the third sequential number and the data written to the second volume, and
    wherein the third controller in the third storage apparatus stores journals sent from the second storage apparatus to the third journal volume, and reflects the journals stored in the third journal volume to the third volume in order of the sequential number included in each of the journals.

3. The storage system according to claim 1,
    wherein the second controller in the second storage apparatus writes data in the journal in the second journal volume in order of the sequential number in the journal, when the second controller in the second storage apparatus reflects the journal in the second journal volume to the second volume, and
    wherein the third controller in the third storage apparatus writes data in the journal in the third journal volume in order of the sequential number in the journal, when the third controller in the third storage apparatus reflects the journal in the third journal volume to the third volume.

4. The storage system according to claim 1, wherein, if the failure occurs in the first storage apparatus, and the second controller in the second storage apparatus requires the third sequential number, the second controller receives the third sequential number from the third storage apparatus to compare the second sequential number with the third sequential number.

5. The storage system according to claim 1,
    wherein after the second controller in the second storage apparatus writes the received differential journals to the second journal volume apparatus, the second controller in the second storage apparatus permits writing to the second volume in case that the third sequential number is newer than the second sequential number, and
    wherein after the third controller in the third storage apparatus writes the received differential journals to the third journal volume, the second controller in the second storage apparatus permits writing to the second volume in case that the second sequential number is newer than the third sequential number.

6. A storage system comprising:
    a first storage apparatus having a first controller with at least one processor, and a plurality of first storage devices configuring a first volume storing data sent from a first host computer and a first journal volume storing journals, wherein each of the journals includes a sequential number and the data written to the first volume;
    a second storage apparatus having a second controller with at least one processor, and a plurality of second storage devices configuring a second journal volume storing journals sent from the first storage apparatus asynchronously and a second volume to which each of the journals stored in the second journal volume is reflected in order of the sequential number in each of the journals; and
    a third storage apparatus having a third controller with at least one processor, and a plurality of third storage devices configuring a third journal volume storing journals sent from the first storage apparatus asynchronously and a third volume to which each of the journals stored in the third journal volume is reflected in order of the sequential number in each of the journals,
    wherein if a failure occurs in the first storage apparatus, if a second sequential number in the latest reflected journal to the second volume is newer than a third sequential number in the latest reflected journal to the third volume, the second controller in the second storage apparatus sends a differential journals to the third storage apparatus, if the second sequential number in the latest reflected journal to the second volume is older than a third sequential number in the latest reflected journal to the third volume, the second controller in the second storage apparatus receives a differential journal from the third storage apparatus, and the second controller in the second storage apparatus changes a copy pair status between the second volume and the third volume, and starts to receive data to the second volume from a second host computer.

7. A storage system comprising:

a first storage apparatus having a first controller with at least one processor, and a plurality of first storage devices configuring a first volume storing data sent from a first host computer and a first journal volume storing journals, wherein each of the journals includes a sequential number and the data written to the first volume;

a second storage apparatus having a second controller with at least one processor, and a plurality of second storage devices configuring a second journal volume storing journals sent from the first storage apparatus asynchronously and a second volume to which each of the journals stored in the second journal volume is reflected in order of the sequential number in each of the journals; and a third storage apparatus having a third controller with at least one processor, and a plurality of third storage devices configuring a third journal volume storing journals sent from the first storage apparatus asynchronously and a third volume to which each of the journals stored in the third journal volume is reflected in order of the sequential number in each of the journals, wherein, based at least in part on an occurrence of a failure in the first storage apparatus, if a second sequential number in the latest reflected journal to the second volume is newer than a third sequential number in the latest reflected journal to the third volume, the second controller in the second storage apparatus sends a differential journal to the third storage apparatus, if a second sequential number in the latest reflected journal to the second volume is older than a third sequential number in the latest reflected journal to the third volume, the second controller in the second storage apparatus receives a differential journal from the third storage apparatus, and the second controller in the second storage apparatus changes a copy pair status between the second volume and the third volume, and receives data to the second volume from a second host computer.

* * * * *